(12) United States Patent
Jones et al.

(10) Patent No.: US 7,143,115 B2
(45) Date of Patent: Nov. 28, 2006

(54) METHOD AND APPARATUS FOR FINDING DIFFERENCES BETWEEN TWO COMPUTER FILES EFFICIENTLY IN LINEAR TIME AND FOR USING THESE DIFFERENCES TO UPDATE COMPUTER FILES

(75) Inventors: Kerry N. Jones, Muncie, IN (US); William F. Wise, Jr., Houston, TX (US)

(73) Assignee: Pocket Soft, Inc., Houston, TX (US)

( * ) Notice: Subject to any disclaimer, the term of this patent is extended or adjusted under 35 U.S.C. 154(b) by 370 days.

(21) Appl. No.: 10/413,784

(22) Filed: Apr. 15, 2003

(65) Prior Publication Data

US 2004/0210551 A1 Oct. 21, 2004

(51) Int. Cl.
  *G06F 12/00* (2006.01)
  *G06F 17/30* (2006.01)
(52) U.S. Cl. ...................... 707/200; 707/203
(58) Field of Classification Search ............. 717/168, 717/174, 121; 707/203, 200
See application file for complete search history.

(56) References Cited

U.S. PATENT DOCUMENTS

| | | | |
|---|---|---|---|
| 5,155,847 A * | 10/1992 | Kirouac et al. | 709/221 |
| 5,359,730 A | 10/1994 | Marron | |
| 5,479,654 A | 12/1995 | Squibb | |
| 5,481,713 A | 1/1996 | Wetmore et al. | |
| 5,659,755 A * | 8/1997 | Strohacker | 708/203 |
| 5,745,906 A | 4/1998 | Squibb | |
| 5,752,039 A * | 5/1998 | Tanimura | 717/168 |
| 5,832,520 A * | 11/1998 | Miller | 707/203 |
| 6,049,672 A | 4/2000 | Shiell et al. | |
| 6,135,651 A | 10/2000 | Leinfelder et al. | |
| 6,374,250 B1 * | 4/2002 | Ajtai et al. | 707/101 |
| 6,526,574 B1 * | 2/2003 | Jones | 717/168 |
| 6,546,552 B1 | 4/2003 | Peleg | |
| 6,938,109 B1 * | 8/2005 | Sliger et al. | 710/68 |

OTHER PUBLICATIONS

Paul Heckel, A Technique for Isolating Differences Between Files, Communications of the ACM, Program Techniques, Apr. 1978, vol. 21, No. 4, pp. 264-268.

* cited by examiner

*Primary Examiner*—Sam Rimell
*Assistant Examiner*—Cory Bell
(74) *Attorney, Agent, or Firm*—Law Office of Tim Cook P.C.

(57) ABSTRACT

A method of updating a computer file from an old file into a new file comprises blocking the new file and the old file into fixed-size blocks, maintaining a window (collection of contiguous blocks) for each file on which lookup preprocessing has been performed, and performing match processing on each new file block in turn (comparing against both the old and new windows) using a key-sampling technique combined with approximate matching. For each new file block, the match information is then optimized for coding efficiency and encoded into a patch file that describes an algorithm for converting the old file into the new file. The patch file application method and apparatus then performs the algorithm described in the patch file. The method uses a fixed amount of random-access memory regardless of the sizes of the two files and uses no temporary mass storage. In addition, the method has a running time roughly proportional to the size of the new file and allows the use of parallel processing to reduce the time required. The system and method produce patch files which are smaller than prior systems and methods, and allow the operator of the apparatus to perform an efficiency/effectiveness trade-off.

37 Claims, 12 Drawing Sheets

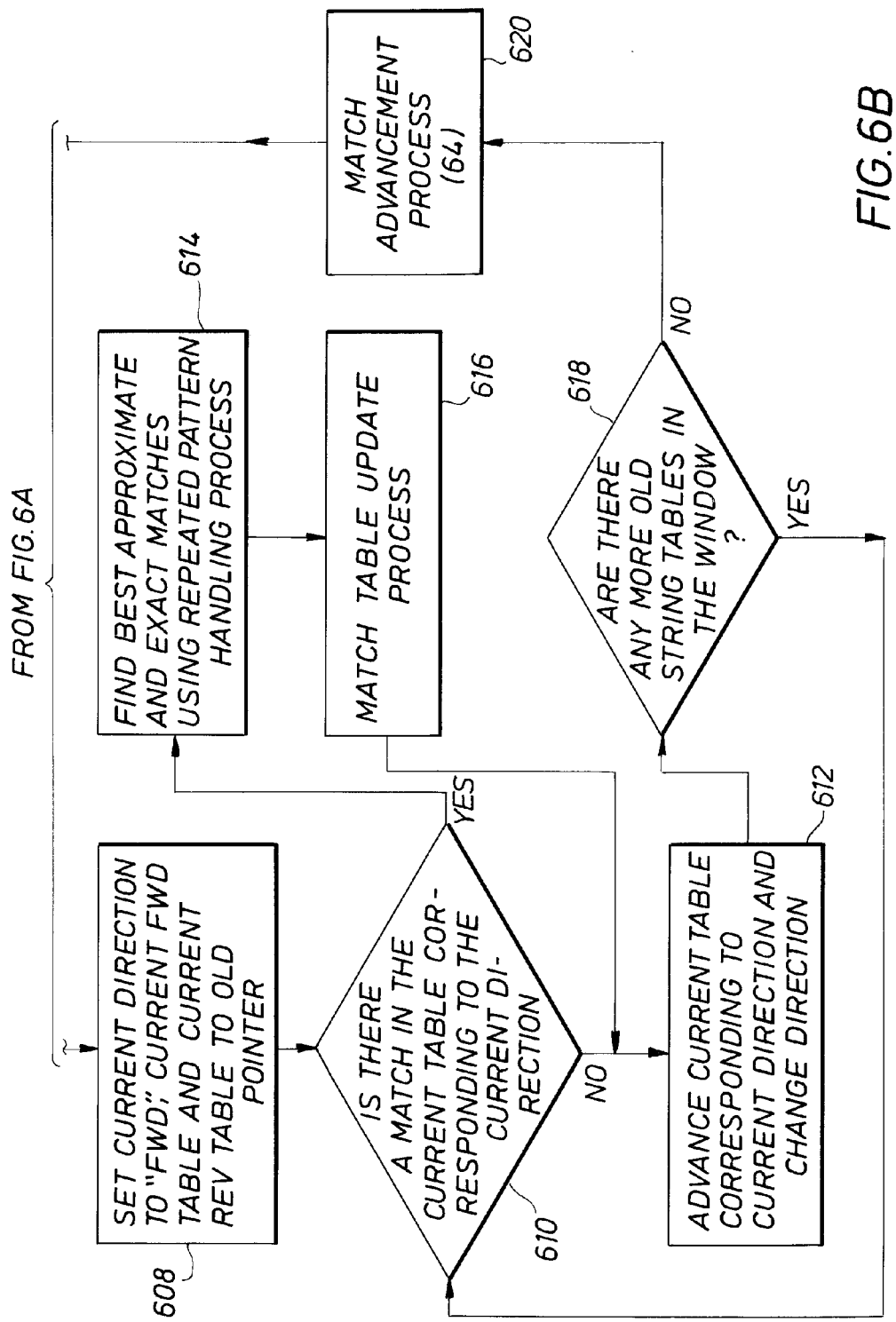

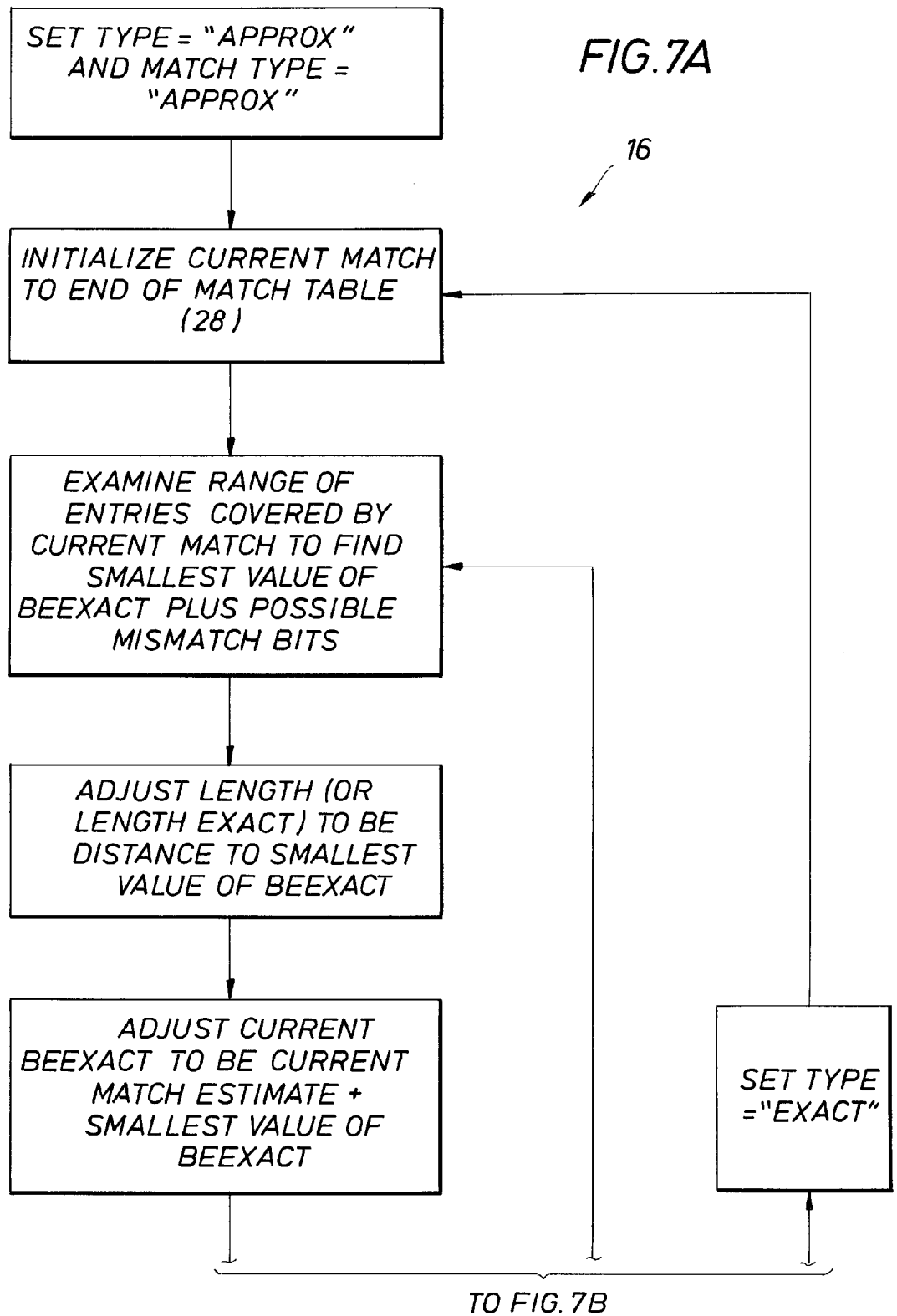

METHOD AND APPARATUS FOR FINDING DIFFERENCES BETWEEN TWO COMPUTER FILES EFFICIENTLY IN LINEAR TIME AND FOR USING THESE DIFFERENCES TO UPDATE COMPUTER FILES

FIELD OF INVENTION

The present invention relates generally to the field of transmission of computer files and, more particularly, to the practice of transmitting updated versions of computer files by transmitting another file containing the differences between the old and new files, then reconstructing the new file at the receiver from the old file and the difference file.

BACKGROUND OF THE INVENTION

To efficiently update a version of a computer file, it is known to transmit a (smaller) file that describes the differences between the old version and the new version. More specifically, the difference file (or patch file) must describe an algorithm that converts the old file into the new file. Generally, known methods for automatically constructing such patch files have used the old file as a dictionary for encoding the new file, so that there are two parts to the patch file building process: finding substrings in the new file that match some substring of the old file, and then encoding these matches and the mismatched region in some efficient way.

There are three essential features to be considered in the design of such a method: efficiency, effectiveness, and scalability. In this context, efficiency refers to the method's economical use of time, effectiveness refers to the size of the patch files produced by the method, and scalability refers to the economical use of computational resources, particularly random-access memory, as the sizes of the old and new files grow. Generally, for any method, there are tradeoffs among these three design parameters. We will discuss the prior art from these three viewpoints.

First, the problems of patch file construction are similar to the problems of file compression problem. In file compression, one normally uses the earlier portion of the file (head) as a dictionary for encoding the later portion of the file (tail). The difference between file compression and patch file construction is that they use a different dictionary. Thus, it might seem that utilizing some of the well-known file compression techniques, adjusted slightly, might produce good results for patch file construction. The discussion here applies equally to the methods in Welch (U.S. Pat. No. 4,558,302); Waterworth (U.S. Pat. No. 4,701,745); Nagy (U.S. Pat. No. 5,001,478); Katz (U.S. Pat. No. 5,051,745); Seroussi et al. (U.S. Pat. No. 5,389,922); and Mayers et al. (U.S. Pat. No. 5,532,694), as well as the other standard on-line compression methods discussed in Storer, *Data Compression, Methods and Theory* (Computer Science Press, 1988). There are three problems with this general approach, no matter which of the above compression methods is used:

1. The need for scalability in the compression methods requires some sort of windowing in which the dictionary is limited to "recent" strings (although, in some cases, strings that have been used frequently get moved to a sort of "Hall of Fame" in which they may continue to be used long after their initial appearance). However, in all cases, a string that isn't used at all within a certain window after its initial appearance will never be used subsequently. This causes significant effectiveness problems when these techniques are used in a patch file construction setting without a sufficiently large window. One particular problem occurs when, for example, a database file is re-sorted, maintaining nearly the same data as before, but in a completely different order. If the window is too small, this will cause the patch file construction method to fail to find all relevant matches. Extremely large files (on the order of hundreds of megabytes) tend not to manifest this modification pattern, but moderately large files (tens of megabytes) certainly do.

2. All these methods utilize exact matches in the string-matching portion of the compression process. While this does not cause any effectiveness problem in the compression case, it does cause problems for patch file construction because it fails to take advantage of the pattern of changes present in many updated files, particularly executable files and databases. These files tend to have large blocks that are the same, with the exception of short (one- to four-character) bursts of mismatches, which arise from code that refers to another part of the file that has moved. Much greater effectiveness (experimentally, in some cases, a factor of 4 in patch file size has been observed) can be achieved by using a "sloppy" match method in which some mismatches are allowed in order to increase the length of the matched strings (and thereby allow fewer matches to be encoded). The mismatches must, of course, be encoded separately. This sort of coding is not used in compression methods because there one doesn't typically have this sort of "burst mismatch" phenomenon occurring.

3. All these methods are what are known in the art as "greedy algorithms." That is, (in this context) matching methods that always use the longest match possible at every stage. Methods that are not "greedy" need an additional pass of the data to make decisions about which match to use at each stage once all the facts are in. There is a good reason for this in the compression case: efficiency. In order to make a compression method sufficiently scalable, one uses the windowing technique mentioned above. One could certain add this optimization to the compression methods, but it seems not to be commonly done in the art.

Consideration of problem (2) above might lead one to consider the methods derived in the field of "approximate string matching". In this field, one basically derives efficient methods for computing the "edit distance" or "Levenshtein distance" between two strings, that is, the minimal number of character insertions, deletions or changes that is required to convert one string to the other. Other measures of similarity are occasionally used, but this is the primary one in the literature. The following discussion applies to all of the following references: *Finding approximate patterns in strings* by E. Ukkonen in *J. Algorithms*, vol. 6 (1985); *Algorithms for approximate string matching* by E. Ukkonen in *Inform. and Control*, vol. 64 (1985); *Minimum detour methods for string or sequence comparison* by F. Hadlock in *Congr. Numer.*, vol. 61 (1988); *On locally optimal alignments in genetic sequences* by N. Blum in *Lecture Notes in Comput. Sci.*, vol. 577 (1992); *String editing under a combination of constraints* by S. Petrović and J. Golić in *Inform. Sci.*, vol. 74 (1993); *Approximate string-matching over suffix trees* by E. Ukkonen in *Lecture Notes in Comput. Sci.*, vol. 684 (1993); *On suboptimal alignments of biological sequences* by D. Naor and D. Brutlag in *Lecture Notes in Comput. Sci.*, vol. 684 (1993); $O(k)$ *parallel algorithms for*

*approximate string matching* by Y. Jiang and A. Wright in *Neural Parallel Sci. Comput.*, vol. 1 (1993); *Longest common subsequences* by M. Paterson and V. Dancik in *Lecture Notes in Comput. Sci.*, vol. 841 (1994); *Parametric optimization of sequence alignment* by D. Gusfield, K. Balasubramanian and D. Naor in *Algorithmica*, vol. 12 (1994); *Approximate string matching with don't care characters* by T. Akutsu in *Inform. Process. Lett.*, vol 55 (1995); and *Fast approximate matching of words against a dictionary* by H. Bunke in *Computing*, vol. 55 (1995).

All of these are quite efficient methods for accomplishing what they set out to do: generally this is to find a portion of a first file (the dictionary) that approximately matches a portion of a second file (the text string). The details of the approximate matching vary from method to method. In some cases, they locate the substring of minimal edit distance; in other cases, they locate the collection of substrings having edit distance within a fixed tolerance of the minimum; in still others, they locate various substrings that are minimal for various choices of weighting in a generalized edit distance. However, they all share two problems relating to their use in patch file building.

In approximate matching, a small edit distance does not directly translate into effective patch file coding. Even using the generalized edit distance approach in which insertions, deletions and substitutions have different costs or weights assigned to them, none of these approaches deals adequately with the sorted database scenario (in which very little of the information has changed, but it has been radically re-ordered) or the very similar problem of an executable file in which the link order was changed. Both of these are quite difficult to deal with from the insertion/deletion/substitution point of view, but the "copy or add" point of view used in a non-windowed compression method deals with these quite handily.

Further, all of these methods have scalability problems. Many of the methods require random-access memory that grows exponentially with the size of the files. None of them can be accomplished, without major modifications, with a fixed amount of random-access memory. These are all theoretical methods that accomplish their goals beautifully, but their design constraints do not necessarily include practicality and scalability.

There is yet another method that is quite familiar to practitioners of the art, usually referred to as "diff" after the Unix command of that name built on this method. This method is discussed in Squibb (U.S. Pat. No. 5,479,654) and is widely known, since the source code to the Unix embodiment of the method is publicly available. The method, developed for use with text files, passes both files simultaneously. When a mismatch occurs, both files are scanned forward, line-by-line, in an attempt to re-align. If realignment occurs, the method proceeds to the next mismatch.

This approach, while completely scalable and quite efficient, has some serious difficulties with effectiveness. First, it does not deal adequately with binary (non-text) files at all. These files are not organized into "lines" and thus the blocking method used by diff fails completely. Second, it does not deal adequately with the burst mismatches so common in executable files. As far as diff is concerned, any mismatch causes the entire block to mismatch (assuming that the blocking problem can be solved somehow). This leads to far too few matches for an effective patch file construction. Third, since it never re-examines previous portions of the old file, it deals inadequately with the sorted database scenario mentioned previously. Fourth, the method is still a "greedy" algorithm.

The first of these problems has been dealt with in a program called "bdiff" (available as part of many newer versions of Unix) which does binary file comparison and patch file construction, but the other three problems have never been adequately resolved in this method: experimentally, bdiff (even when the resulting patch files are compressed) produces much larger patch files than, for example, .RTPatch by Pocket Soft, Inc., shown and described in U.S. Pat. No. 6,526,574 and assigned to the same assignee as the present invention. Its scalability, efficiency, and effectiveness may be assessed by experimental means.

There is another class of patch file construction methods known in the art. These may be collectively referred to as "block-and-hash" methods. In these methods, the old file is divided into (usually fixed-size) blocks and a signature (or hash function) is computed for each block. Then, the same procedure is used on the new file and the hash tables are compared. Any blocks having the same hash value are then examined for matches and the usual "copy or add" encoding is applied to build a patch file. This class of methods includes those in Queen (U.S. Pat. No. 4,807,182); Pyne (U.S. Pat. No. 5,446,888); Squibb (U.S. Pat. No. 5,479,654); and Morris (U.S. Pat. No. 5,574,906). Like "diff," these methods tend to be completely scalable and quite efficient, but not very effective for many purposes. In some cases, an isolated insertion at the beginning of the new file can cause the method to find no matches at all. In order to overcome this serious difficulty, some methods do away with the blocking on the new file and hash at every position. This, however, degrades the efficiency markedly. Still more problematic, however, is the fact that the burst mismatches so common in executable files cause many matches to go undiscovered by these methods. Finally, they are all "greedy" methods, which, as observed above, inherently lose some effectiveness.

We have mentioned that "greedy" methods are inherently somewhat lower in effectiveness than "optimized" methods. There is a known solution to the optimal coding problem that does apply to this situation, namely, Wagner's algorithm (see Storer, *Data Compression, Methods and Theory*, Computer Science Press, 1988). This method provides a scheme for optimizing the "copy or add" encoding of a file in terms of any fixed dictionary. To apply Wagner's algorithm to this problem (in conjunction with the approximate matching method mentioned above, to help with the burst mismatches), it would be necessary to locate every approximate match between old and new files and keep track of the number of isolated mismatches within each approximate match and their positions relative to the beginning of the approximate match. With all this information in hand, Wagner's algorithm gives a "most effective possible" solution to the encoding problem. However, there are serious scalability problems here (storage of all the approximate matches as well as each mismatch within each approximate match) as well as efficiency problems (in gathering the data, not in applying Wagner's algorithm, which is itself quite efficient).

Another known method is that described in Jones (U.S. Pat. No. 6,526,574). This method is efficient, effective, and scaleable in terms of mass storage and random-access memory resources, but does not scale well in terms of time. Specifically, its time is quadratic with the size of the new file, so that it is impractical to use with extremely large files (hundreds of megabytes).

We conclude our discussion of the prior art with experimental results on .RTPatch, ver. 3.20 by Pocket Soft, Inc., mentioned above as being experimentally superior in effectiveness to the combination of bdiff and compression. This commercial product is fairly effective and efficient on small files, but has serious scalability problems. In order to work efficiently, it needs twice as much random-access memory as the file size and in fact fails completely on files above 20–30 million characters in size.

Accordingly, several objects and advantages of our invention are that it provide a method that is scalable (all files are accessed sequentially, so they can be located offline; essentially no temporary mass storage resources are needed; random-access memory requirement is constant), effective (patch file size is, in empirical tests, significantly smaller than prior art tested—bdiff, version 3.20 of .RTPatch, version 4.00 of .RTPatch which is based on Jones (U.S. Pat. No. 6,526,574) and efficient (running time is linear in the size of the files, substantially shorter running time than existing commercial products of comparable effectiveness).

This method is also tunable in the sense that the operator can perform an effectiveness/efficiency tradeoff. The method is also amenable to embodiments employing parallel processing to further reduce the time required by the method.

Still further objects and advantages will become apparent from a consideration of the ensuing description and accompanying drawings.

DETAILED DESCRIPTION OF PREFERRED EMBODIMENTS

The present invention provides a method and an apparatus for comparing two binary files and producing a patch file containing the differences between the two files. The apparatus includes a file input means, a plurality of string table storage means, a match table storage means, patch file output means, a means for preparing an OLD string table, a means for preparing a match table and a NEW string table, a means for optimizing the match table, a means for patch file encoding, and a means for reconstructing the second file from the first file and the patch file.

Patch Construction

Figure 1:
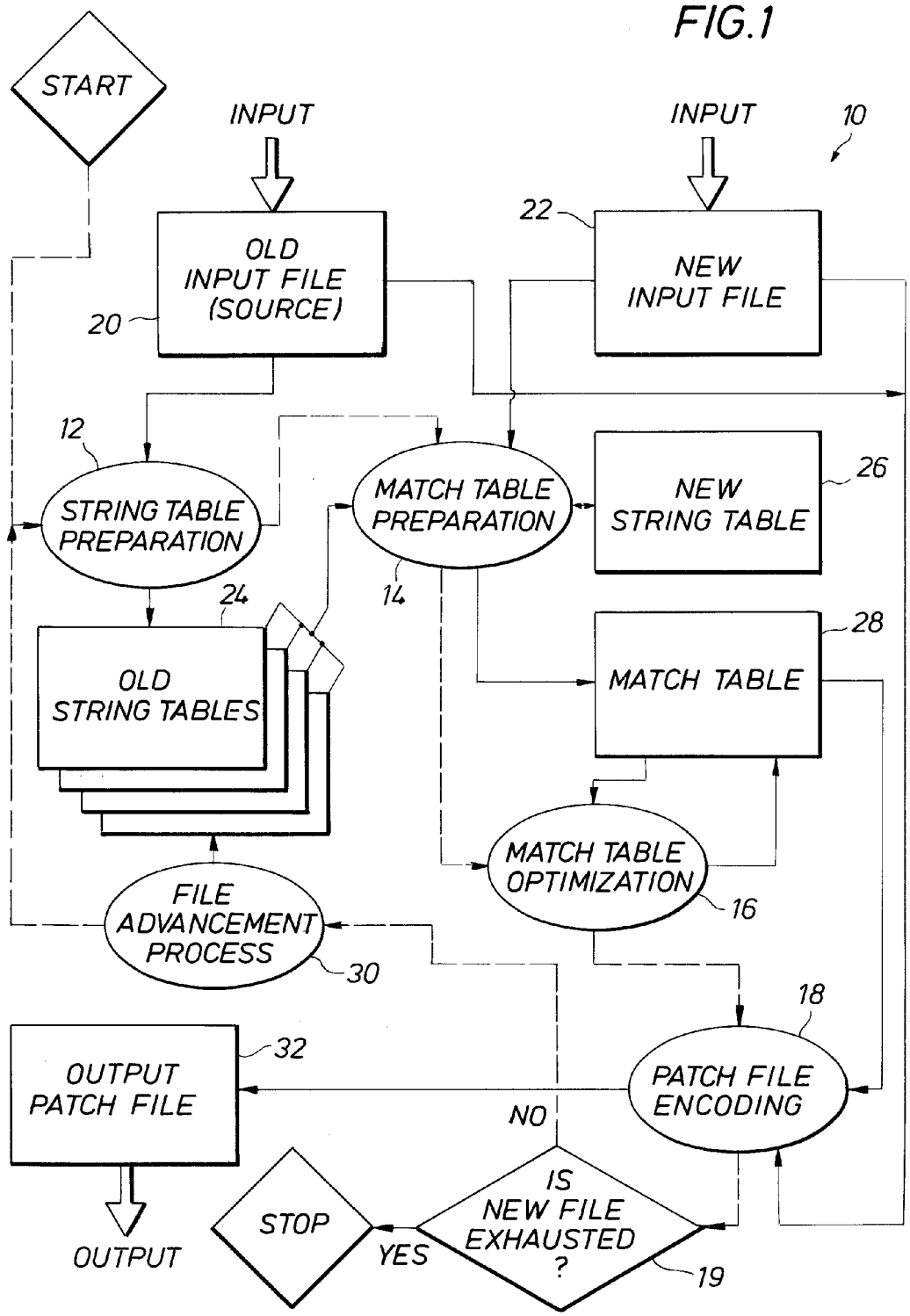
FIG. 1 is a block diagram of the patch file construction system and process.

FIG. 1 illustrates an overview of a presently preferred embodiment of a system 10 for the construction of an output patch file. A NEW String Table, retained in a NEW String Table storage means 26, is initialized to empty. An OLD Input File is input into an OLD Input File (Source) storage means 20 and from there to a String Table Preparation module 12, which uses a contiguous portion of the OLD Input File (Source) storage means 20 to produce a plurality of OLD String Tables, which are stored in an OLD String Tables storage means 24. Throughout this description, a "module" may also be referred to as a "process" or "method", to the same extent. Next, a Match Table Preparation module 14 takes a portion of a NEW Input file stored in a NEW Input File storage means 22 and the OLD String Tables in the OLD String Tables storage means 24 and produces a Match Table, which is retained in a Match Table storage means 28. The Match Table Preparation module also produces or alters NEW string table in a NEW String Table storage means 26. At this point, a Match Table Optimization module 16 operates on the Match Table in the Match Table storage means 28 and alters it. A Patch File Encoding module 18 then operates on the Match Table in the Match Table storage means 28, the OLD Input File (Source) 20 and the NEW Input File 22 to produces a portion of a Patch File, passing it to Patch File output means 32. The OLD Input File (Source) 20 and the NEW Input File 22 are then advanced by a File Advancement module 30 and the process is repeated until the entire NEW input file 22 has been processed, as determined by a decision module 19.

Patch Application

Figure 2:
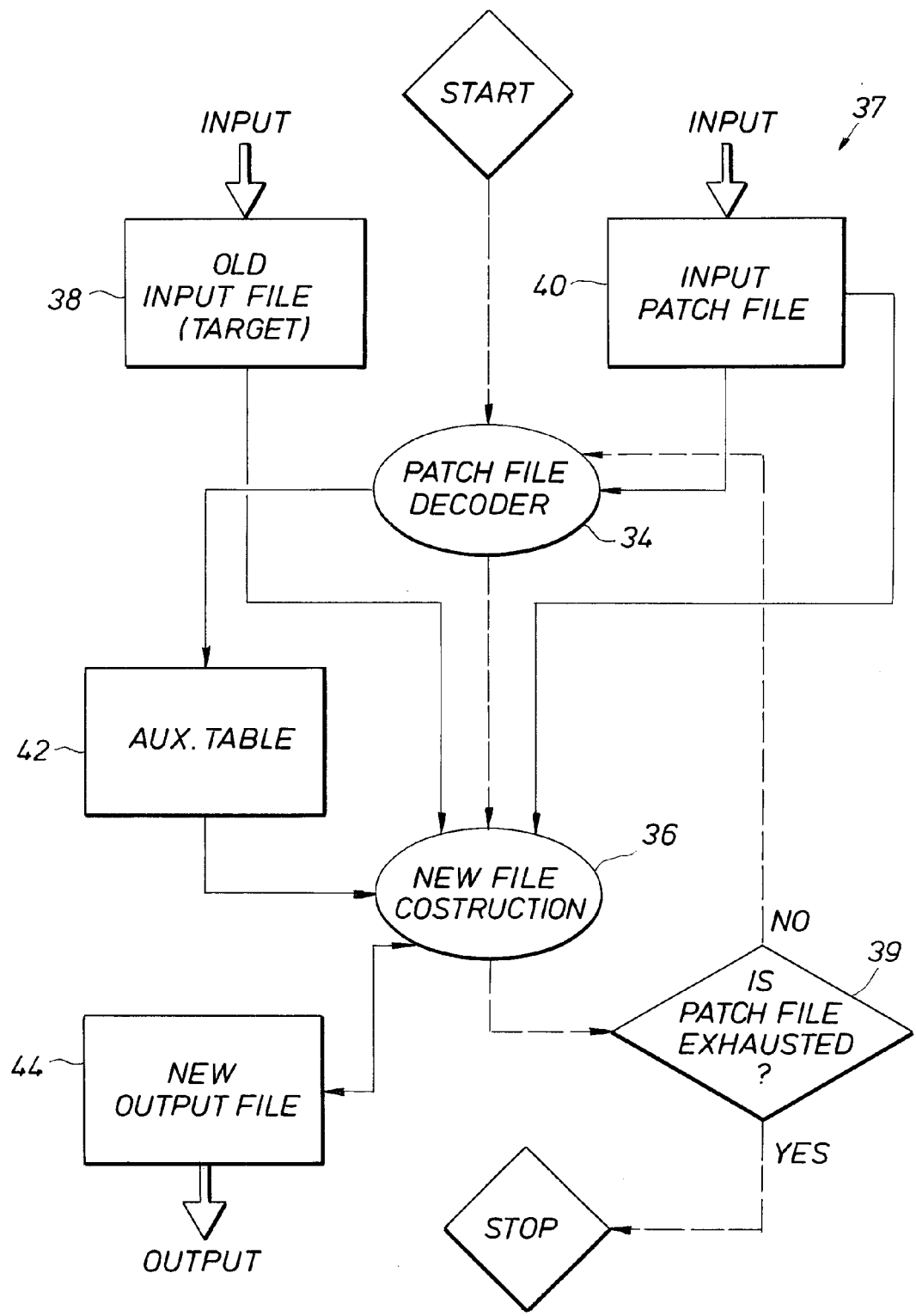
FIG. 2 is a block diagram of the preferred embodiment of the patch file application process (that is, the process of using a patch file and an old file to produce the new file).

FIG. 2 illustrates an overview of a presently preferred embodiment of a system 37 for patch application. An Input Patch File 40 is passed to a Patch File Decoder module 34 which processes a block of the Input Patch File 40 and produces an Auxiliary Table 42. A NEW File Construction module 36 then operates on the Auxiliary Table 42 and a portion of an OLD Input File (Target) 38 to produce a portion of a NEW Output File 44. This process is repeated until the entire Input Patch File 40 has been processed, as determined by a decision module 39. At that point, the NEW Output File 44 has been entirely constructed.

OLD String Table

Figure 3:
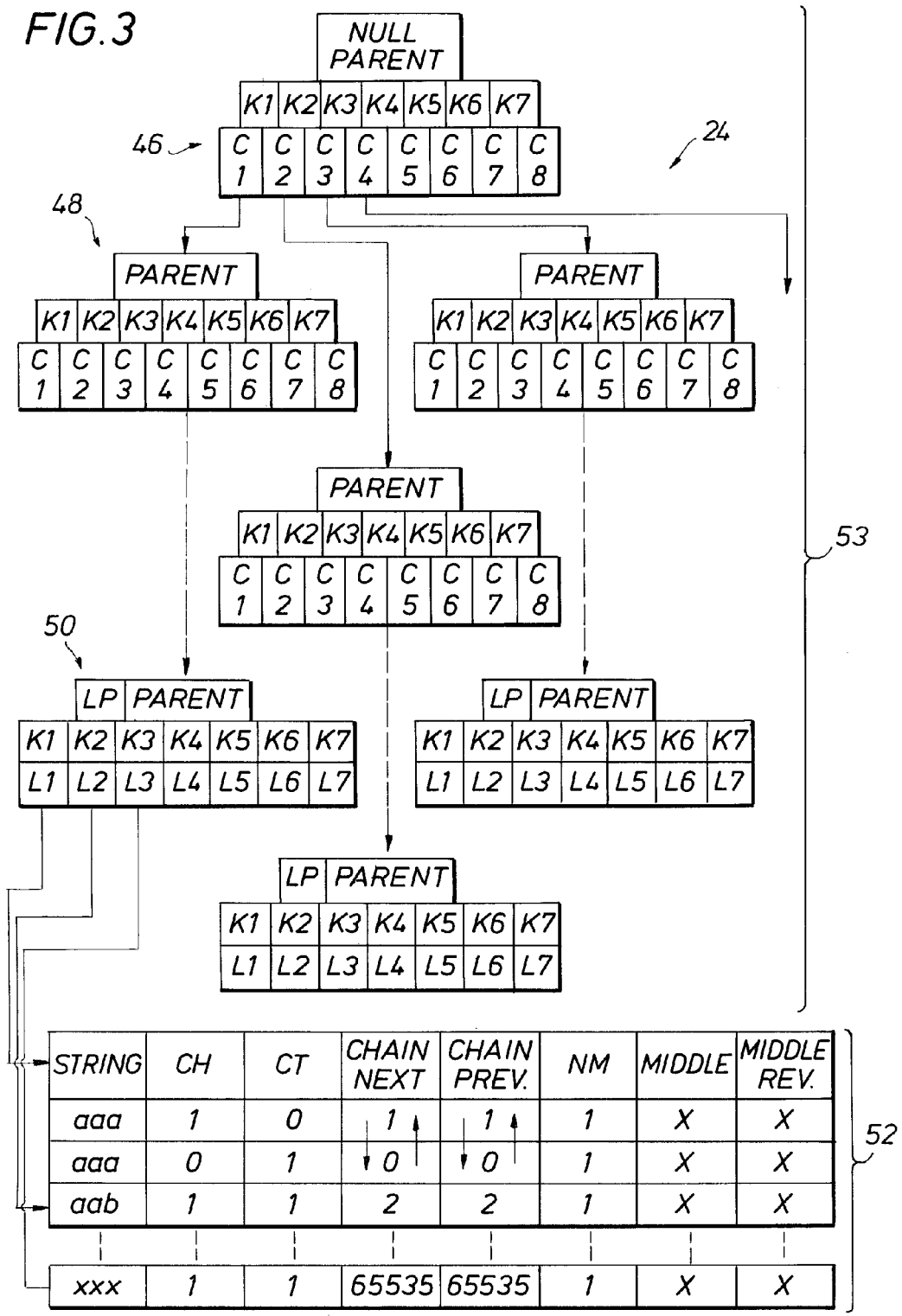
FIG. 3 shows the preferred embodiment of the OLD String Table.

FIG. 3 illustrates a presently preferred embodiment of one of a plurality of OLD String Tables 24 (see FIG. 1), in accordance with this invention. Each OLD String Table 24 corresponds to a block of fixed size in the OLD Input File (Source) 20. An OLD String Table comprises two data structures: a Chain Array 52 and an eight-way B-tree 53. The Chain Array 52 has its rows indexed by character offsets relative to the beginning of the block (with each offset being a multiple of a fixed increment). The preferred embodiment uses a block size which is 65536 multiplied by the selected increment so that the Chain Array 52 has 65536 rows. The initial swings of length three located at multiples of the selected increment are organized into chains. A chain is a group of offsets whose first three characters are identical. The eight-way B-tree 53 comprises one B-Tree Root Node 46, a plurality of B-Tree Interior Nodes 48, and a plurality of B-Tree Leaf Nodes 50, and is used to locate the first entry of each chain, given the three characters with which each string in the chain begins.

Each row of the Chain Array 52 comprises 8 entries, labeled in FIG. 3 as String, CH, CT, ChainNext, ChainPrev, NM, Middle, and MiddleRev. The String column contains the string of length equal to the selected increment which begins at the indicated offset. CH contains a 1 if the indicated position is the first entry of a chain and contains a 0 otherwise. CT contains a 1 if the indicated position is the last entry of a chain and contains a 0 otherwise. ChainNext (respectively, ChainPrev) contains the index of the next (respectively, previous) entry in the chain. A chain is linked together in a circular fashion, so that the ChainNext column in a row in which CT is equal to 1 points to the first entry in that chain. Similarly, the ChainPrev column in a row in which CH is equal to 1 points to the last entry in the chain. The last three columns are used to locate a position within a given chain which is closest to a fixed offset within the block. These are only in use for one OLD String Table at any given time, and are only valid for entries which have CH equal to 1. NM is equal to 1 for rows in which Middle and MiddleRev are not in use. If CH is equal to 1 and NM is equal to 0, then the Middle (respectively, MiddleRev) column contains the index of the chain member which is the first chain entry after (respectively, before) the fixed offset.

NEW String Table

Figure 4:
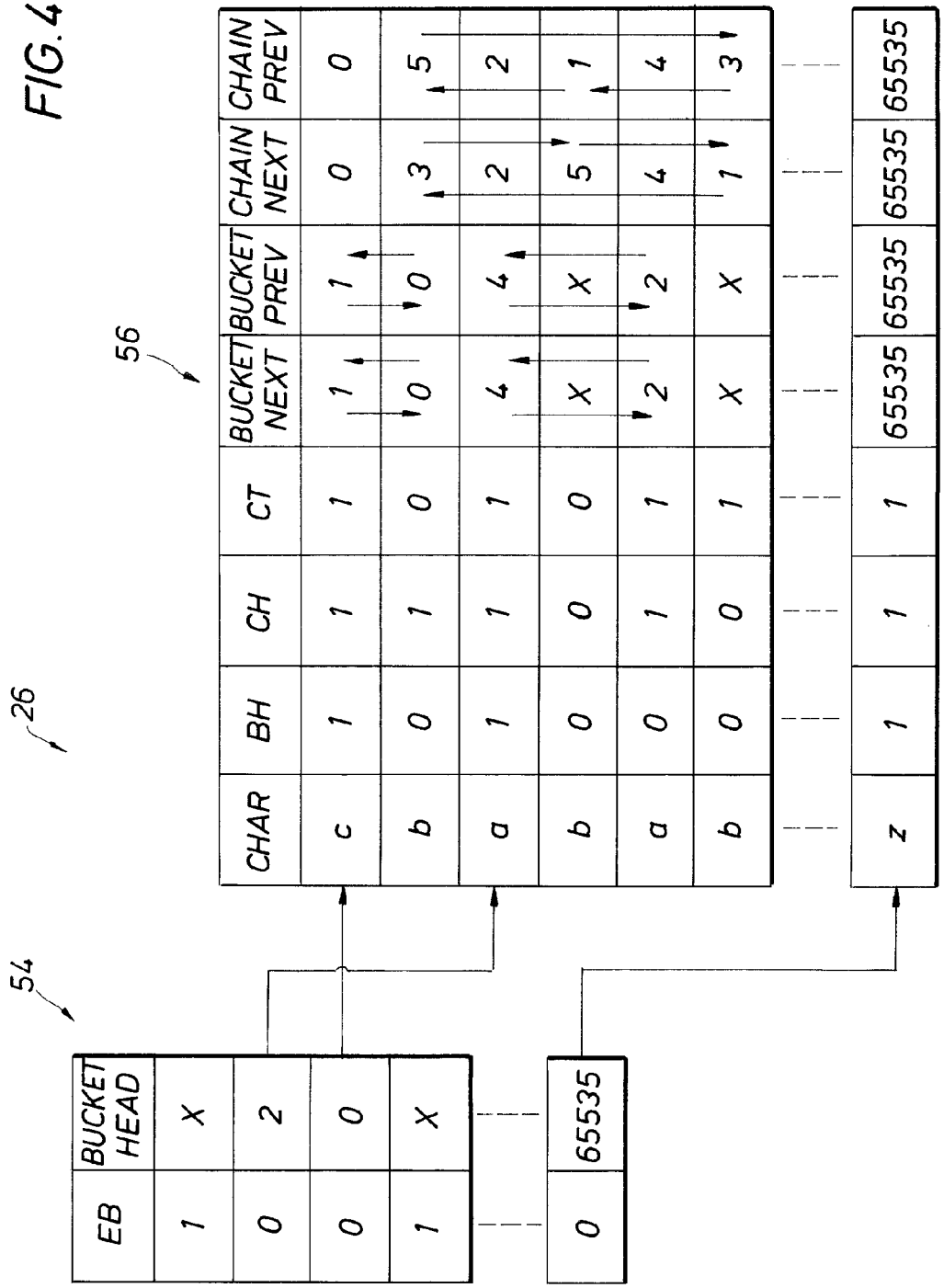
FIG. 4 shows the preferred embodiment of the NEW String Table.

FIG. 4 illustrates a presently preferred embodiment of the NEW String Table 26 (see FIG. 1), in accordance with this invention. The NEW String Table 26 comprises two arrays, a Hash Array 54 and a Bucket/Chain Array 56. The Bucket/Chain Array 56 contains a row for each character of the current block of the NEW Input File 22—the preferred embodiment uses a block size of 65536 characters—and is indexed modulo the block size, so that, for example, row 100 will represent offset 100 relative to the current block, after offset 100 has been processed, but will represent offset 100 relative to the previous block until offset 100 has been processed. The Hash Array 54 has its rows indexed by the possible values of a hash function derived from a string of fixed size (three characters in the preferred embodiment). The preferred embodiment uses a 16-bit hash function so that both arrays have 65536 rows. The initial strings of length three which have already been processed into the NEW string table are organized into hash buckets and chains. A chain is a group of offsets whose first three characters are identical. A hash bucket is a group of chains whose first three characters have the same hash function value.

Each row of the Bucket/Chain Array 56 comprises 8 entries, labeled Char, BH, CH, CT, BucketNext, BucketPrev, ChainNext, and ChainPrev. The Char column contains the character located at the indicated offset of the current (or previous) block. BH contains a 1 if the indicated position is the first entry of a hash bucket and contains a 0 otherwise. CH contains a 1 if the indicated position is the first entry of a chain and contains a 0 otherwise. CT contains a 1 if the indicated position is the last entry of a chain and contains a 0 otherwise. If CH is a 1, then BucketNext (respectively, BucketPrev) contains the index of the first entry of the next (respectively, previous) chain in the bucket, otherwise BucketNext (respectively, BucketPrev) is undefined and unused. A bucket is linked together in a circular fashion, so that the last chain in a bucket may be identified as possessing a BucketNext field which indexes a row with BH equal to 1. ChainNext (respectively, ChainPrev) contains the index of the next (respectively, previous) entry in the chain. A chain is also linked together in a circular fashion, so that the ChainNext column in a row in which CT is equal to 1 points to the first entry in that chain. Similarly, the ChainPrev column in a row in which CH is equal to 1 points to the last entry in the chain.

Each row of the Hash Array 54 comprises 2 columns, labeled EB and BucketHead. EB contains a value of 1 if there are no chains in the corresponding hash bucket, otherwise it contains a 0. If EB contains a 0, then BucketHead contains the index of the first entry in the first chain in the hash bucket, otherwise BucketHead is undefined and unused.

An empty NEW string table 26 is indicated by setting the entire EB column to the value 1.

Match Table

Figure 5:
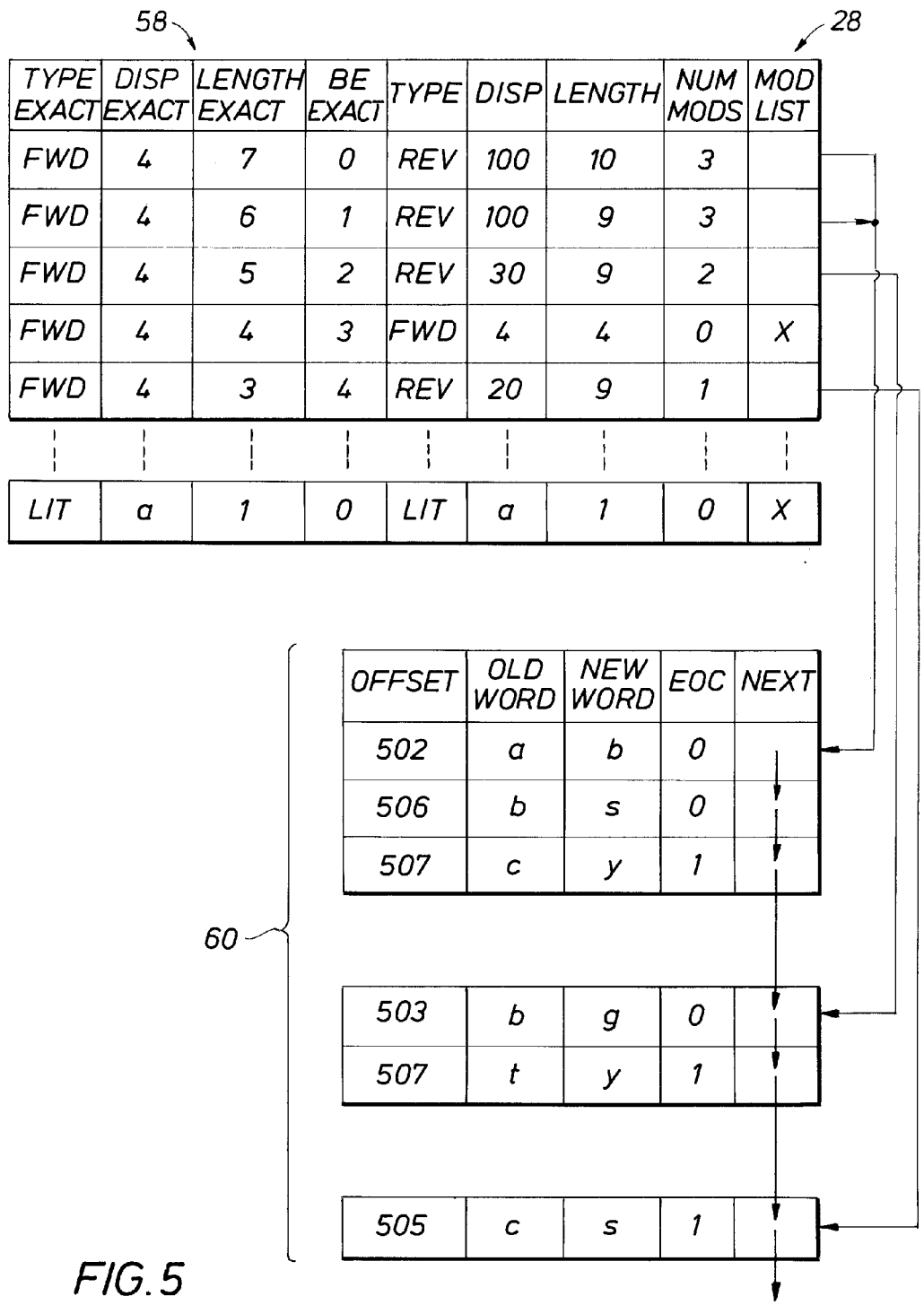
FIG. 5 shows the layout of the Match Table.

FIG. 5 depicts a presently preferred structure for a Match Table 28 in accordance with this invention. The Match Table 28 comprises two data structures: a Match Description Array 58 and a Modification List 60 comprising a plurality of sublists. The Match Description Array 58 has rows indexed by the characters in the current block of the NEW Input File 22—the preferred embodiment uses a block size of 65536 characters. The main list is maintained principally for convenience in erasing all the data in the sublists when they are no longer needed.

Each row of the Match Description Array 58 comprises 9 entries, labeled Type, Disp, Length, ModList, NumMods, TypeExact, DispExact, LengthExact, and BEExact. Type contains an identifier of the kind of match which is the currently best identified approximate match for the indicated offset relative to the current block of the NEW Input File 22. Match types are: literal, NEW, OLD forward and OLD reverse. Disp contains an unsigned integer which is interpreted in various ways, depending on the Type column—it is either the literal value of the character, the backward offset to the NEW file match, the forward offset to the OLD match or the reverse offset to the OLD match. Length contains the length of the currently best identified approximate match. ModList identifies a sublist entry which refers to the first mismatch within the currently best identified approximate match. NumMods is the number of entries in the ModList sublist. TypeExact identifies the type of the currently best identified exact match for the indicated offset relative to the current block of the NEW Input File 22. DispExact and LengthExact are analogous to Disp and Length, but refer to the currently best identified exact match. BEExact is used for various purposes in various phases of the method. Except during match optimization, BEExact contains the distance that the currently best identified exact match may be extended in the reverse direction. During match optimization, BEExact contains an estimate of the number of bits required to encode the block of the NEW file from the indicated offset forward.

Each sublist entry in the Modification List 60 comprises 5 entries, labeled EOC, Offset, OldWord, NewWord, and Next. EOC contains a 1 if the entry is the end of a mismatch chain, and contains 0 otherwise. Offset contains the absolute position of the mismatch in the NEW Input File 22. OldWord contains the value expected to be at that position. NewWord contains the actual value at that position. The preferred embodiment retains four characters in OldWord and NewWord, since it allows mismatches of up to four characters in length. Next identifies the next entry in the sublist. Note that Next may be valid even when EOC is equal to 1, allowing potentially unrelated lists to be chained together for administrative convenience.

Match Table Preparation Flowchart

Figure 6A:
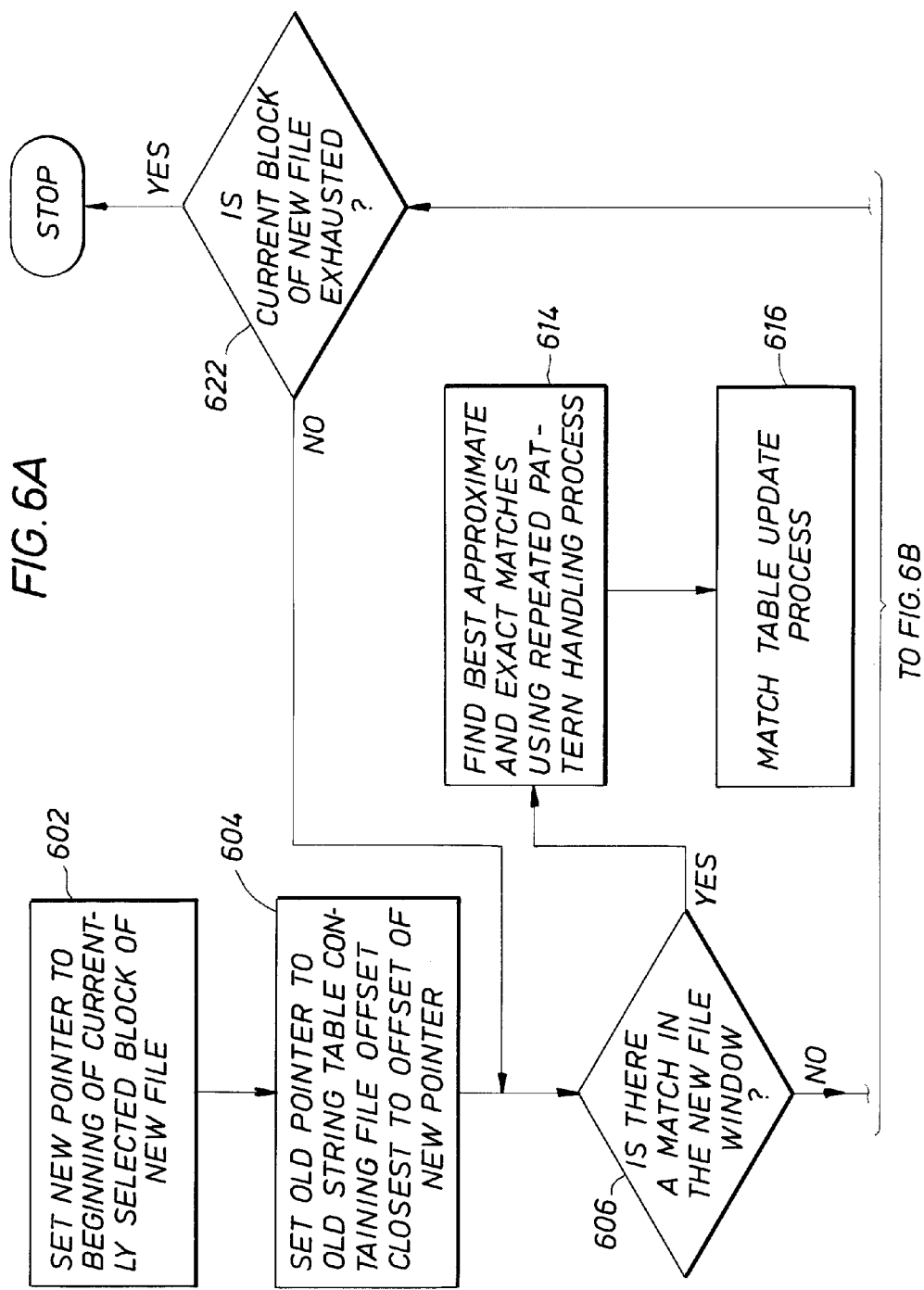
FIG. 6 is a flowchart of the Match Table Preparation Process.

FIG. 6 illustrates graphically the steps in the Match Table Preparation Module 14. The details of this process are discussed more fully in the Operation section below.

Match Table Optimization Flowchart

Figure 7B:
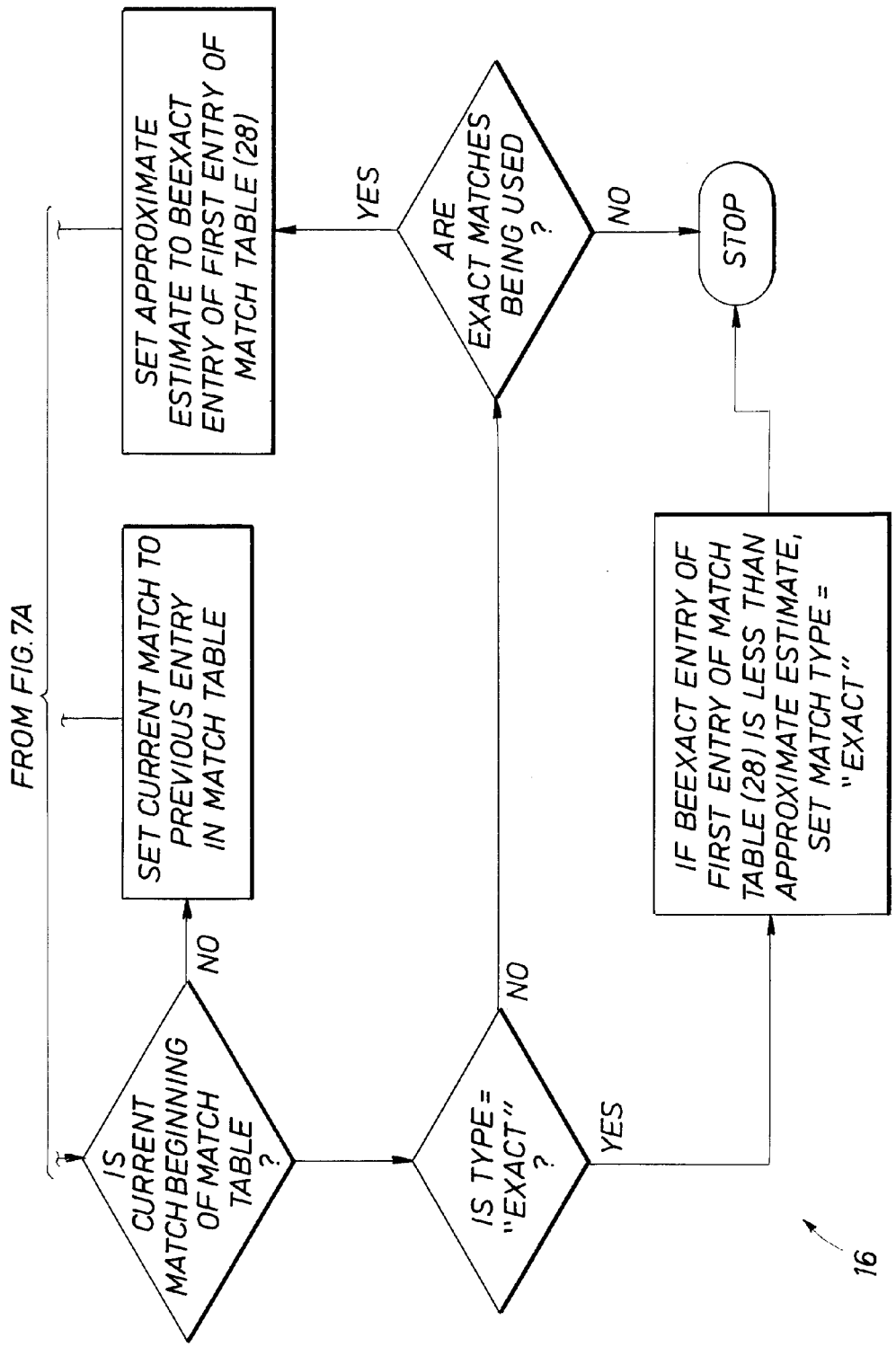
FIG. 7 is a flowchart of the Match Table Optimization Process.

FIG. 7 illustrates graphically the steps in the Match Table Optimization Module 16. The details of this process are discussed more fully in the Operation section below.

Patch File Encoding Flowchart

Figure 8A:
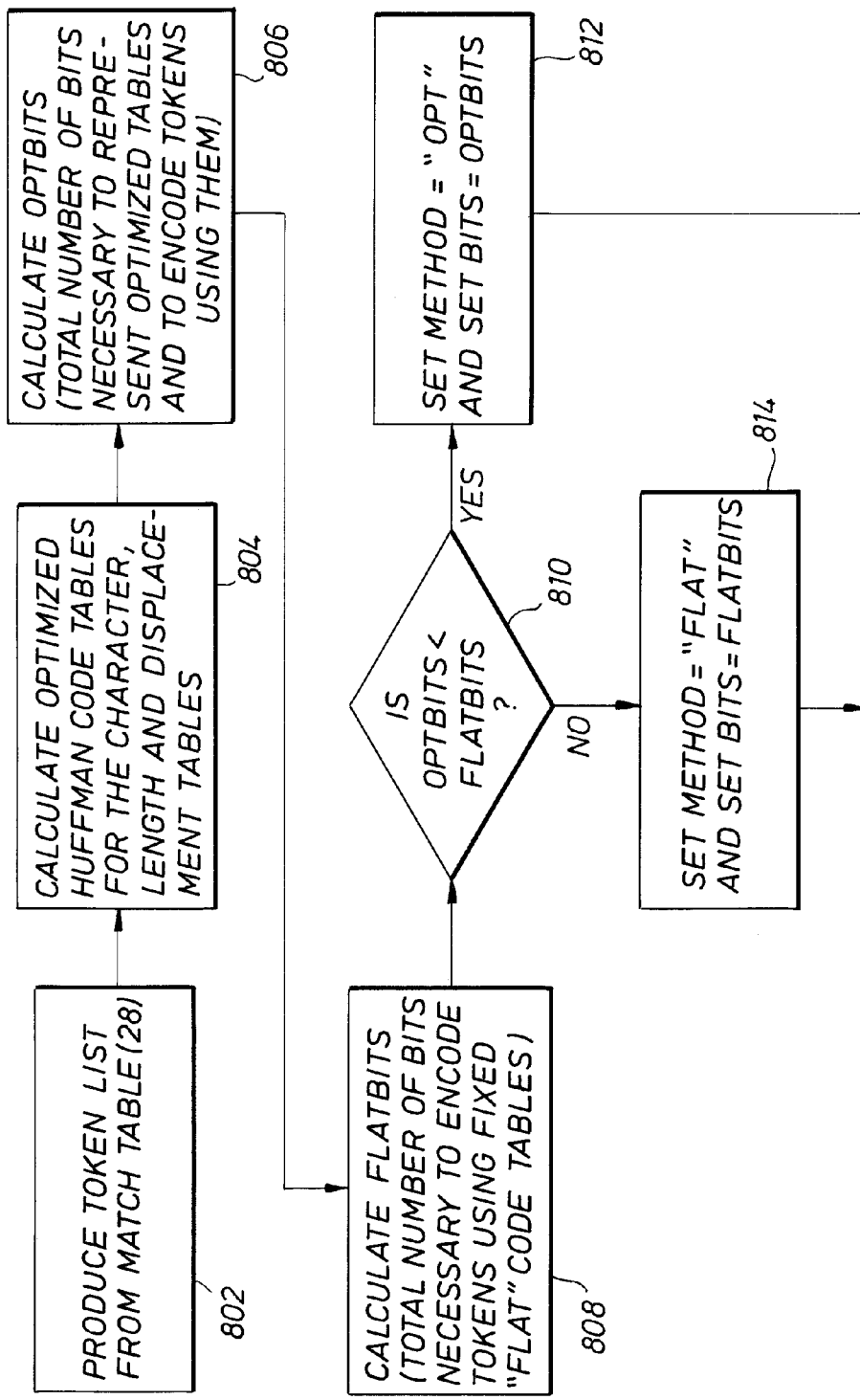
FIG. 8 shows a flowchart of the Patch File Encoding Process (18)
Figure 8B:
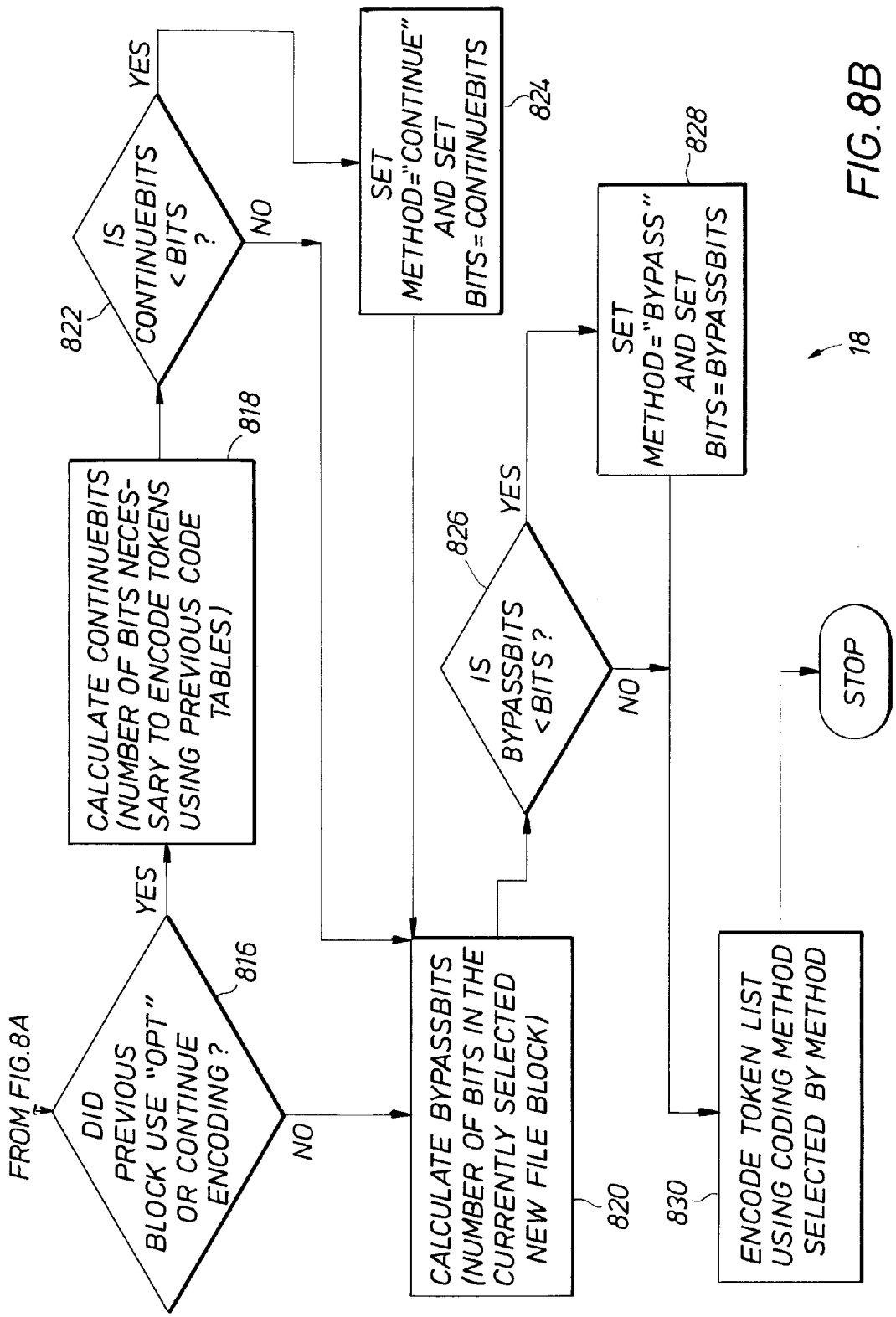

FIG. 8 illustrates graphically the steps in the Patch File Encoding Module 18. The details of this process are discussed more fully in the Operation section below.

Schematic Diagram of Patch Build Data Usage

Figure 9:
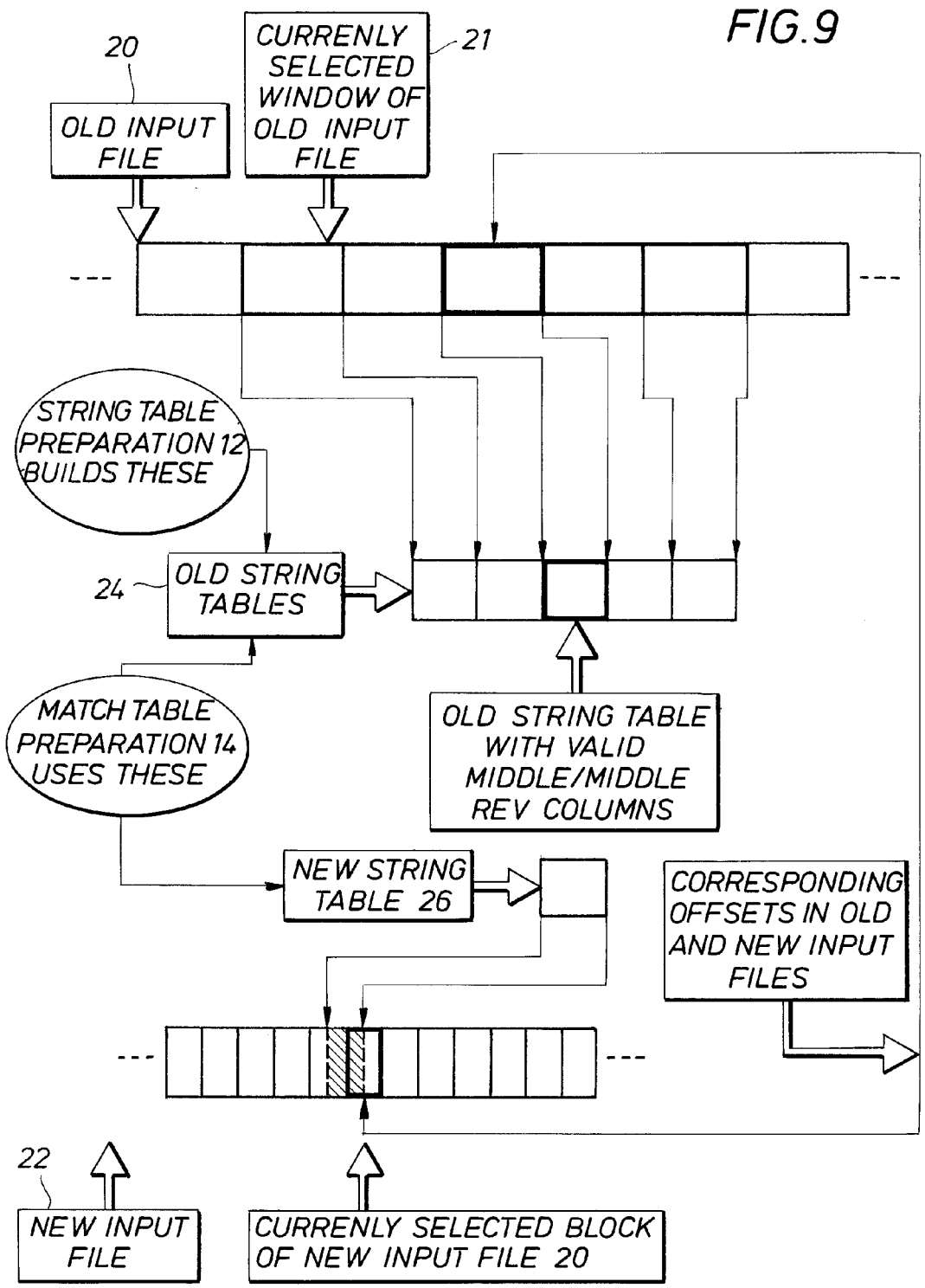
FIG. 9 shows a schematic of the data usage in the patch file construction process

FIG. 9 shows how the various string tables and input files interrelate during the Patch Build process.

Operation

There are a number of design parameters for the method of the present invention that will impact our discussion of the method in various ways. We begin by enumerating these and giving the values that are used in the preferred embodiment.

Speed factor (parameter 1): this parameter controls the granularity of the OLD String Tables 24. Increasing this value allows one to increase efficiency at the expense of effectiveness. The preferred embodiment uses operator-selectable values between 0 and 15 inclusive. The granularity of the OLD String Tables is then set to one more than twice the speed factor.

Approximate-matching tolerances (parameter 2): these parameters control how closely two strings must coincide to be considered a "match." Altering these tolerances allows one to tailor the method for specific patterns of changes with different kinds of data. There is a pair of tolerances used in the preferred embodiment: a local tolerance and a global tolerance, both expressed as fractions. A local tolerance of $8/16$ specifies that out of each 16 adjacent characters, 8 would be allowed to mismatch before the match was terminated. A global tolerance of $1/3$ specifies that the total number of mismatches can be at most $1/3$ of the total characters in the match. The preferred embodiment uses values of ($8/16$, $1/3$).

Chain length limits (parameter 3): this parameter controls the maximum number of identical key values that will be chained together in the OLD String Tables 24 and NEW String Table 26. It is necessary to limit this for efficiency reasons. If no limit is placed on the length of a chain, then a file consisting entirely of repeating patterns degrades the efficiency of the Match Table Preparation 14 process without helping its effectiveness. Too low a value for this limit, however, will cause effectiveness problems, since some potentially useful matches will not be found. The preferred embodiment uses a fixed value of 4096 for this parameter, but values between 250 and 16000 are certainly reasonable. Altering this parameter based on available memory size is also a potentially helpful ramification of the preferred embodiment.

Coding estimation parameters (parameter 4): these control the scoring (used in the Match Table Preparation 14) of an approximate match. The preferred embodiment uses a score for a match of half the length of the exactly matching prefix plus the integer quotient of the number of exactly matching characters and one more than the number of mismatching characters. As an example, a match which comprises 20 characters, 6 of which mismatch, with the first mismatch occurring on the $8^{th}$ character, would receive a score of $(7/2)+(14/7)=5$, whereas a match which comprises 15 characters, 2 of which mismatch, with the first mismatch occurring on the $9^{th}$ character, would receive a score of $(8/2)+(13/2)=10$ and would be regarded as a better match, a priori. This scoring is used only for approximate matches; exact matches are ranked by their length.

Block Size parameters (parameter 5): these control the size of the blocks used in the OLD String Tables 24 and NEW String Table 26. These may be specified independently. The preferred embodiment uses 65536 characters for the NEW Block Size. For the OLD Block Size, it uses the maximum size which allows for the storage of 65536 strings in each table. This size is thus dependent on the granularity of the OLD String Table, which is selected by parameter 2.

Window size parameter (parameter 6): this controls the number of OLD String Tables that will be maintained. The preferred embodiment allows this to be specified by the operator.

Minimum NEW match size (parameter 7): this controls the size of the substring keys which are hashed into the NEW String Table 26. The preferred embodiment uses a fixed size of 3 characters.

Minimum OLD match size (parameter 8): this controls the size of the substring keys which are indexed with the B-Trees in the OLD String Tables 24. The preferred embodiment used operator-selectable values of 4, 6 or 8 characters.

Minimum advancement size (parameter 9): this affects the amount of progress made when an approximate match is located. The preferred embodiment uses operator-selectable values of 1, 4 or 8 characters. In addition, one of three strategies may be selected: normal, half-greedy and greedy. The preferred embodiment uses normal for speed factors of 0 through 7 inclusive, half-greedy for speed factors of 8 through 11 inclusive, and greedy for speed factors of 12 through 15 inclusive. Either the half-greedy or greedy strategy eliminates the use of exact matches.

The patch build process proceeds by initially selecting the first block of the NEW file (size selected by parameter 5) and emptying the NEW String Table 26. The String Table Preparation module 12 then produces a number (selected by parameter 6) of OLD String Tables 24. These tables are designed to provide extremely rapid location of all matching strings of appropriate lengths (selected by parameter 8). All the strings in a block which begin with the same substring are chained together in circular doubly-linked lists (the information in the Chain Array 52), whose heads may be rapidly located by way of an 8-way B-Tree. In addition to the usual information needed for a circular doubly-linked list, the Chain Array also optionally maintains two additional pointers into each list, labeled Middle and MiddleRev. These two pointers are positioned so as to point to the strings in the chain which are the nearest strings, in the forward or reverse direction, to a fixed offset within the block of the OLD Input File (Source) 20 to which this OLD String Table 24 refers.

When the OLD String Tables 24 corresponding to the initial window of the OLD Input File (Source) 20 have all been built, the Match Table Preparation Process 14 of FIG. 6 is initiated. This process locates both approximate and exact matches for substrings of the NEW Input File 22. These matches will be located either in earlier portions of the NEW Input File 22 or in portions of the OLD Input File (Source) 20 which are indexed by the OLD String Tables 24. The Match Table Preparation Module 14 proceeds using five state variables: Current NEW Pointer, Current OLD Pointer, Current Direction, Current FWD Table, and Current REV Table. Initially, in step 602, Current NEW Pointer, which maintains the position of the substring in the NEW Input File 22 for which matches are being sought, is set to point to the beginning of the currently selected block of the NEW Input File 22. In step 604, the Current OLD Pointer is initially set to point to the OLD String Table 24 which indexes that portion of the OLD Input File (Source) 20 having its file offset closest to the file offset of the Current NEW Pointer. If the OLD String Table 24 which is pointed to by the Current OLD Pointer does not currently have valid Middle and MiddleRev columns, these are built relative to the OLD Input File (Source) 20 offset closest to the offset of the Current NEW Pointer.

The Match Table Preparation Process 14 then proceeds in step 606 to locate matches by the following procedure.

Throughout this description, if the match advancement strategy (selected by parameter 9) is greedy or half-greedy, the exact matching will not be used and will not be computed:

1. Using the NEW String Table 26, locate any approximate or exact matches in the recent portion of the NEW Input File 22.
2. If any are found, examine a number of matches selected by parameter 3, proceeding in reverse order from chain tail. If the string being matched begins with a repeated pattern of length 1, 2, 3, or 4, use Repeated Pattern Handling Process 64 to avoid examining some of the matches which will never contribute a best match. Decide which matches are best, using estimates controlled by parameter 4, and record the best match in the match table, then
3. Set Current Direction to "FWD" in step 608, set both Current FWD Table and Current REV Table to point to the OLD String Table 24 indicated by Current OLD Pointer. Repeatedly use the following process until all OLD String Tables 24 have been examined:
    a. Use Current Direction to select either the Current FWD Table or the Current REV Table.
    b. Using selected table, locate any approximate or exact matches in the OLD Input File block indexed by selected table in step 610. If any are found, examine a number of matches selected by parameter 3, proceeding in reverse order from chain tail (MiddleRev if valid) if Current Direction is "REV", but proceeding in forward order from chain head (Middle if valid) if Current Direction is "FWD". If the string being matched begins with a repeated pattern of length 1, 2, 3, or 4, use Repeated Pattern Handling Process 64 to avoid examining some of the matches which will never contribute a best match. In step 614, decide which of the examined matches are best, using estimates controlled by parameter 4, and record the best match in the Match Table 28, then
    c. In step 612, if Current Direction is "FWD," advance Current FWD Table to next OLD String Table. If Current Direction is "REV," advance Current REV Table to previous OLD String Table. Change Current Direction.
4. In step 616, use the Match Advancement Process to adjust the Current NEW Pointer, and, if needed, Current OLD Pointer and the Middle and MiddleRev columns of the OLD String Table 24 pointed to by the Current OLD Pointer. This process also records the matches in the Match Table 28 and adjusts the NEW String Table 26 to reflect the adjustment in the Current NEW Pointer.

In step 614, to decide which matches are "best," an approximate match will be extended exactly in the reverse direction and extended in the forward direction for a distance controlled by parameter 2. When thus extended, a "best" approximate match must have forward length greater than or equal to the forward length of the match currently recorded in the Match Table 28 for this offset, and have a score strictly greater than the score of the "best" match encountered so far, or have a score equal to the score or the "best" match encountered so far and a reverse length greater than the reverse length of the "best" match encountered so far.

To be considered a "best" exact match, a match must have forward length greater than the forward length of the "best" exact match encountered so far, or have forward length equal to the forward length of the "best" exact match encountered so far and a reverse length greater than the reverse length of the "best" exact match encountered so far.

The Match Advancement Process 616 first decides whether or not to override the best match found with a literal (only in the case of extremely short matches for which literal coding is shorter than coding the displacement of the match). Then, if the current best match changed, it performs the following procedure:

1. Build a sublist of the Modification List 60 corresponding to the mismatches in the best approximate match found (if the best approximate match changed).
2. Fill in prior entries in the Type, Disp, Length, NumMods and ModList columns of the Match Table 28 for a distance equal to the reverse length of the best approximate match so as to correspond to reverse extension of the best approximate match
3. Fill in subsequent entries in the Type, Disp, Length, NumMods and ModList columns of the Match Table 28 for a distance equal to the forward length of the best approximate match so as to correspond to forward extension of the best approximate match.
4. Normal strategy only: Fill in prior entries in the TypeExact, DispExact and LengthExact columns of the Match Table 28 for a distance equal to the reverse length of the best exact match so as to correspond to reverse extension of the best exact match.
5. Normal strategy only: Fill in subsequent entries in the TypeExact, DispExact and LengthExact columns of the Match Table 28 for a distance equal to the forward length of the best exact match so as to correspond to forward extension of the best exact match.

Then, calculate the Advancement Increment (how far to advance the Current NEW pointer). This calculation is made as follows:

1. If the best match was changed, do the following:
    a. Do one of the following, depending on the advancement strategy in use (selected by parameter 9):
        i. If the normal strategy is in use, set the Advancement Increment to the length of the best exact match.
        ii. If the half-greedy strategy is in use, set the Advancement Increment to the length of the best approximate match. If this amount is more than 256, reduce it by one half.
        iii. If the greedy strategy is in use, set the Advancement Increment to the length of the best approximate match.
    b. If the Advancement Increment is longer than the minimum advancement amount, adjust down so that the excess is a multiple of the OLD String Table granularity (one more than twice the speed factor). If the Advancement Increment is longer than the minimum of the length of the best approximate match and the length of the best exact match, set it to this minimum.
2. If the best match was not changed, do the following:
    a. Do one of the following, depending on the advancement strategy in use (selected by parameter 9):
        i. If the normal strategy is in use, and there is a mismatch in the best approximate match, set the Advancement Increment to the distance between the current NEW pointer and the first matching character after the first mismatch. If this distance is longer than the minimum advancement amount, adjust up so that the excess is a multiple of the OLD String Table granularity (one more than twice the speed factor). If the Advancement Increment is longer than the minimum of the length of the best approximate match and the length of the best exact match, set it to this minimum.
ii. If the normal strategy is in use, and there are no mismatches remaining in the best approximate match, set the Advancement Increment to the minimum of the length of the best approximate match and the length of the best exact match.
iii. If the half-greedy or greedy strategy is in use, set the Advancement Increment to the length of the best approximate match.
3. If the Advancement Increment is less than the minimum advancement amount (selected by parameter 9), fill in the Match Table 28 entries beyond the current entry whose distance lies between the Advancement Increment and the minimum advancement amount with literal matches. Set Advancement Increment to the minimum advancement amount.

Once the Advancement Increment is calculated, the Current NEW Pointer is advanced by this amount. This is done by the following procedure:
1. Do the following a number of repetitions equal to the Advancement Increment:
   a. If the NEW String Table 26 is full, delete the first string in the table.
   b. Add the next string in the NEW File to the NEW String Table 26.
2. If the NEW File offset of the Current NEW Pointer plus the Advancement Increment is not located in the OLD String Table 24 corresponding to the Current OLD Pointer, then do the following:
   a. Delete the Middle and MiddleRev columns in the OLD String Table 24 corresponding to the Current OLD Pointer.
   b. Set the Current OLD Pointer to correspond to the OLD String Table 24 that contains the NEW File offset of the Current NEW Pointer plus the Advancement Increment (or the last OLD String Table currently maintained).
   c. Build the Middle and MiddleRev columns in the OLD String Table 24 corresponding to the Current OLD Pointer, based on the offset of the NEW File offset of the Current NEW Pointer plus the Advancement Increment (or the end of the table).
3. If the NEW File offset of the Current NEW Pointer plus the Advancement Increment is located in the OLD String Table 24 corresponding to the Current OLD Pointer, then adjust the Middle and MiddleRev columns to correspond to the NEW File offset of the Current NEW Pointer plus the Advancement Increment.

The Repeated Pattern Handling Process 620 is responsible for ensuring that target strings that begin with repeated patterns do not cause the examination of unnecessary strings in either the NEW String Table 26 or the OLD String Tables 24. It operates as follows:
1. Calculate the Target Repeat Size (number of characters in the repeated pattern) and Target Repeat Count (number of repetitions of the pattern) in the string being matched.
2. If an OLD String Table is being examined in the forward direction, calculate the Source Repeat Size and Source Repeat Count of the potential match being examined. Then,
   a. If the Repeat Sizes are different, ignore this potential match and skip over all the repetitions in the source string before examining another potential match.
   b. If the Repeat Sizes are the same and the Source Repeat Count is greater than or equal to the Target Repeat Count, advance the position in the source (OLD File) by a number of repetitions equal to the difference between the two counts, and begin extending the match after the initial repetitions (but include the repetitions in the length count). Then, skip over all the repetitions in the source string before examining another potential match.
3. If an OLD String Table 24 is being examined in the reverse direction or the NEW String Table 26 is being examined (always in the reverse direction), calculate the Source Repeat Size and Source Repeat Count in the reverse direction of the potential match being examined. Then,
   a. If the Repeat Sizes are different, ignore this potential match and skip backward over all the repetitions in the source string before examining another potential match.
   b. If the Repeat Sizes are the same and the Source Repeat Count is greater than or equal to the Target Repeat Count, begin extending the match after the initial repetitions in the Target string (but include the repetitions in the length count). Then, skip backward over all the repetitions in the source string before examining another potential match.

When the Match Table Preparation Process 14 is concluded, the Match Table Optimization Process 16 is executed. The logic flow of this module is shown in FIG. 7. This process passes the Match Table 28 in reverse (from the end to the beginning) two times, once to produce an approximate matching estimate and once to produce an exact matching estimate. Each pass uses a variant of Wagner's algorithm to adjust the lengths of the overlapping matches (either approximate or exact) so as to minimize the estimated total number of bits required to encode the matches. The process then selects the match method (approximate or exact) that produces the smaller bit estimate. This process has two functions:
1. Adjusting the lengths of the approximate and exact matches so as to produce a non-overlapping collection of matches, doing so in such a way as to produce an optimal encoding, and
2. Deciding whether to use the approximate or the exact matches in encoding the selected block of the NEW Input File 22.

The first function is achieved by processing the Match Table 28 in reverse order, using the BEExact column of the Match Table 28 to store an estimate of the number of bits needed to encode the block from that point on. The approximate matches are processed first. As each Match Table entry is processed, the subsequent entries covered by the Current Match are examined, and the entry is located which has the smallest value of BEExact plus an estimate of the number of bits required to encode the Current Match mismatches up to that entry. The length of the Current Match is then set to be the difference between the Current Match and the entry where the smallest value was found. BEExact in the Current Match row is then set to be equal to the smallest value found, plus an estimate of the number of bits needed to encode the Current Match itself, exclusive of any mismatches. When the entire Match Table 28 has been processed, the BEExact value of the first row is an estimate of the total number of bits needed to encode the entire block optimally using approximate matches. If normal strategy is set (by parameter 9), then this value is stored and the process is repeated for the exact matches.

The second function is achieved by comparing the exact match estimate to the approximate match estimate and using the match type which has the lower estimate. If a strategy other than normal is being used, then approximate matches are used always, since the exact match columns were not computed in the Match Table Preparation Process 14.

When the Match Table Optimization Process 16 is concluded, the Patch File Encoding Process 18 of FIG. 8 is executed. This process makes extensive use of an internal Token List, comprising an array with one row per output codeword, with each row comprising four columns: Type, CodeWord, NumExtraBits and ExtraBits. The Type field is one of three values: C, D or L, indicating that the codeword is to be encoded with the Character, Displacement or Length table. The CodeWord field is a 9-bit or 6-bit codeword, depending on whether the Type field is a C or not (the Character table is a 9-bit table and the Displacement and Length tables are 6-bit tables). The NumExtraBits field is determined by the previous two and is stored for convenience. It indicates how many additional bits follow the variable-length codeword. One fixed codeword schema is used and its description is in Tables 1, 2 and 3 below. Many other codeword schemata are possible, as long as the Patch File Encoding Process 18 and the Patch File Decoder Process 34 agree on the particular schema being used. The ExtraBits field contains the actual bits which are to follow the variable-length codeword.

The Character table is used for two distinct purposes:
1. Encoding literal characters, hexadecimal 00 through hexadecimal FF, and
2. Encoding match types and mismatches (hexadecimal 100 through 113).

The Displacement table is also used for two distinct purposes:
1. Encoding match displacements, and
2. Encoding displacements between successive mismatches (or displacements between the beginning of the previous match and a mismatch).

The Length table is used for a single purpose, that of encoding match lengths.

Each table also has a Table Escape value (hexadecimal 114 for the Character table and hexadecimal 33 for the Displacement and Length tables).

Mismatches are encoded either by a literal encoding of the one-, two- or four-character difference between the match contents and the actual file, or by referring to a Most-Recently-Used (MRU) list of the preceding 16 one-character differences or the preceding 256 two-character and four-character differences.

The choice as to which of the three tables is to be used for decoding the variable-length codewords is encoded into the bit stream itself without any additional overhead by assuming that the first codeword of each token is encoded with the Character table. Any non-Character table codewords follow this Character codeword and their presence is indicated by the particular Character codeword as described in Table 1.

The Patch File Encoding Process 18 comprises the following steps:
1. Processing the optimized Match Table 28 to produce the Token List in step 802.
2. In steps 804, 806, and 808, calculating the number of bits necessary to encode this Token List in several different ways.
3. In steps 810 through 828 inclusive, selecting the encoding method that produces the smallest number of total bits.
4. Encoding the Patch File using the selected encoding method in step 830.

The encoding methods used by the preferred embodiment are:
1. Constructing optimized Huffinan Code tables for each of the three code tables and prefixing the tables with the encoded bit stream.
2. Using "flat" encoding, in which all of the Characters occupy 8 or 9 bits and all of the Displacements and Lengths occupy 5 or 6 bits.
3. Using the code table generated for the previous block, together with appropriate Table Escapes for codewords that were not present in the previous block.
4. Using "bypass" encoding, transmitting the entire NEW File block as is, with no coding at all (only necessary when a block is completely new and sufficiently random so as to defeat compression).

The Patch Application process, shown in FIG. 2, consists of a Patch File Decoder module 34 which processes the Input Patch File 40 one block at a time, reversing the Patch File Encoding Process 18 to obtain an Auxiliary Table 42 which is identical to the Token List used by the Patch File Encoding Process. This Auxiliary Table 42 is then used by the NEW File Construction Process 36, which produces a block of the NEW Output File 44 by copying matches from the OLD Input File (Taruet) 38 and previously constructed portions of the NEW Output File 44, modified appropriately by the mismatch indications in the Auxiliary Table 42. These two processes alternate until the entire NEW Output File 44 is constructed.

TABLE 1

Character Table Schema

| Hexadecimal Codeword | Meaning | Followed by |
|---|---|---|
| 00-FF | Literal Character | Nothing |
| 100 | End of Block | Nothing |
| 101 | One-character mismatch | 8 bits + Disp |
| 102 | Two-character mismatch | 16 bits + Disp |
| 103 | Four-character mismatch | 32 bits + Disp |
| 104 | Window match | Disp + Length |
| 105 | 0 displacement match | Length |
| 106 | One-character MRU mismatch | 4 bits + Disp |
| 107 | Two-character MRU mismatch | 8 bits + Disp |
| 108 | Four-character MRU mismatch | 8 bits + Disp |
| 109 | One-character previous mismatch | Disp |
| 10A | Two-character previous mismatch | Disp |
| 10B | Four-character previous mismatch | Disp |
| 10C | FWD match, increase from previous | Disp + Length |
| 10D | FWD match, same as previous | Length |
| 10E | FWD match, decrease from previous | Disp + Length |
| 10F | REV match, increase from previous | Disp + Length |
| 110 | REV match, same as previous | Length |
| 111 | REV match, decrease from previous | Disp + Length |
| 112 | FWD match | Disp + Length |
| 113 | REV match | Disp + Length |
| 114 | Table Escape | 9 bits (which are then interpreted as the corresponding entry in this table) |

TABLE 2

Displacement Table Schema (dots indicate bits which are supplied by literal suffix)

| Hexadecimal Codeword | Meaning (Binary Displacement) | Followed by |
|---|---|---|
| 00 | 1 | Nothing |
| 01 | 1 . | 1 bit |
| 02 | 1 . . | 2 bits |
| 03 | 1 . . . | 3 bits |
| 04– | 001 . . . . – | 4 bits |
| 0A | 111 . . . . | |
| 0B– | 100 . . . . . – | 5 bits |
| 0E | 111 . . . . . | |
| 0F– | 100 . . . . . . – | 6 bits |
| 12 | 111 . . . . . . | |
| 13– | 10 . . . . . . . . – | 8 bits |
| 14 | 11 . . . . . . . . | |
| 15– | 10 . . . . . . . . . – | 9 bits |
| 16 | 11 . . . . . . . . . | |
| 17– | 10 . . . . . . . . . . – | 10 bits |
| 18 | 11 . . . . . . . . . . | |
| 19– | 10 . . . . . . . . . . . – | 11 bits |
| 1A | 11 . . . . . . . . . . . | |
| 1B– | 10 . . . . . . . . . . . . – | 12 bits |
| 1C | 11 . . . . . . . . . . . . | |
| 1D– | 10 . . . . . . . . . . . . . – | 13 bits |
| 1E | 11 . . . . . . . . . . . . . | |
| 1F– | 10 . . . . . . . . . . . . . . – | 14 bits |
| 20 | 11 . . . . . . . . . . . . . . | |
| 21– | 01 . . . . . . . . . . . . . . . . – | 16 bits |
| 23 | 11 . . . . . . . . . . . . . . . . | |
| 24– | 01 . . . . . . . . . . . . . . . . . . – | 18 bits |
| 26 | 11 . . . . . . . . . . . . . . . . . . | |
| 27– | 1 . . . . . . . . . . . . . . . . . . . . – | 20 bits– |
| 32 | 1 . . . . . . . . . . . . . . . . . . . . . . . . . . . . . . . | 31 bits |
| 33 | Table Escape | 6 bits (which are then interpreted as the corresponding entry in this table) |

TABLE 3

Length Table Schema (dots indicate bits which are supplied by literal suffix)

| Hexadecimal Codeword | Meaning (Binary Length) | Followed By |
|---|---|---|
| 00– | 01 – | Nothing |
| 02 | 11 | |
| 03– | 10 . – | 1 bit |
| 04 | 11 . | |
| 05– | 010 . . – | 2 bits |
| 0A | 111 . . | |
| 0B– | 100 . . . – | 3 bits |
| 0E | 111 . . . | |
| 0F– | 100 . . . . – | 4 bits |
| 12 | 111 . . . . | |
| 13– | 10 . . . . . – | 6 bits |
| 14 | 11 . . . . . . | |
| 15– | 10 . . . . . . – | 7 bits |
| 16 | 11 . . . . . . | |
| 17– | 10 . . . . . . . – | 8 bits |
| 18 | 11 . . . . . . . | |
| 19– | 10 . . . . . . . . – | 9 bits |
| 1A | 11 . . . . . . . . | |
| 1B– | 10 . . . . . . . . . – | 10 bits |
| 1C | 11 . . . . . . . . . | |
| 1D– | 01 . . . . . . . . . . . – | 12 bits |
| 1F | 11 . . . . . . . . . . . | |
| 20– | 01 . . . . . . . . . . . . . – | 14 bits |
| 22 | 11 . . . . . . . . . . . . . | |
| 23– | 1 . . . . . . . . . . . . . . . – | 16 bits– |
| 32 | 1 . . . . . . . . . . . . . . . . . . . . . . . . . . . . . . | 31 bits |
| 33 | Table Escape | 6 bits (which are then interpreted as the corresponding entry in this table) |

FIG. 9 illustrates a presently preferred embodiment of a schematic for the use of Patch Build Data. Note that there is an array of OLD String Tables 24, each of which corresponds to a block of the OLD Input File (Source) 20. The entire array of OLD String Tables 24 corresponds to a contiguous collection of blocks, which comprise the currently selected window 21 of the OLD Input File (Source) 20. The particular OLD String Table 24 which corresponds to the block containing the current file offset is the only OLD String Table 24 which has valid Middle/MiddleRev pointers, since it is processed in both the forward and reverse directions. All other OLD String Tables 24 are only processed in one direction. There is a single NEW String Table 26 which refers to a portion of the NEW Input File 22 overlapping the currently selected block and the previously selected block of the NEW Input File 22.

Alternate Parallel Processing Patch Build Process

With some modifications to the preferred embodiment, multiple processors may be used on adjacent blocks of the NEW file simultaneously, allowing even more efficient use of time.

In order to facilitate multiple processors simultaneously operating on the same OLD and NEW files, each processor would need its own copy of the NEW string table. Some pre-processing would also be needed to initialize the NEW string table to the values appropriate for the preceding block of the NEW file, which block may be currently undergoing processing by another processor. Most of the OLD string tables may be shared, however—only the NM, Middle and MiddlePrev columns need ever be private to a particular processor, and each processor would only need such a private copy for one of the OLD string tables at any given time. Apart from these modifications, the operation is identical to the preferred embodiment.

Accordingly, it can be seen that this method provides a scalable, efficient, effective and tunable means for transmission of an updated binary computer file with significant improvements over the prior art.

Although the description above contains many specificities, these should not be construed as limiting the scope of the invention but as merely providing illustrations of some of the presently preferred embodiments of this invention. Various other embodiments and ramifications are possible within its scope. For example, special handling could be added to allow for file serialization (portions of the OLD file that differ between the OLD Input File 20 and the OLD Input File (Target) 38); other ramifications might simplify the process by, for example, making the match table optimization process not alter the match table at all, thus trading effectiveness for efficiency and effectively making this method a "greedy" algorithm.

Thus the scope of the invention should be determined by the appended claims and their legal equivalents, rather than by the examples given.

We claim:

1. A method for converting an OLD computer file into an updated NEW computer file, said method comprising the steps of:
   a. identifying differences between said OLD file and a NEW computer file by passing both files through a patch build program, the patch build program comprising the steps of:
      i. identifying matches between the OLD file and the NEW computer file by
         (a). dividing the NEW computer file into blocks of fixed size,
         (b). successively comparing each block to a contiguous group of blocks of fixed size in the OLD file, and
         (c). scanning each pair of adjacent blocks of the NEW computer file for matched strings whose starting positions in the NEW computer file differ by less than a fixed window size;
      ii. creating a patch file based on identified matches in step a., wherein the patch file comprises a plurality of blocks corresponding to the fixed size blocks of the NEW computer file and incorporates matched strings in the OLD file and the matched strings in the NEW computer file; and
   b. combining said OLD file and said patch file by passing both files through a patch apply program to obtain said NEW file.

2. The method of claim 1 wherein the step of identifying matches between the OLD computer file and the NEW computer file includes the steps of:
   a. initializing a NEW string table;
   b. selecting a plurality of adjacent blocks beginning with a first block of said OLD file;
   c. processing each selected block of the plurality of adjacent blocks with a string table preparation subroutine thereby creating an OLD string table from each selected block;
   d. selecting a block beginning with a first block of said NEW file;
   e. processing the selected block of said NEW file, said NEW string table, and said OLD string tables with a match table preparation subroutine thereby creating a match table and updating said NEW string table initialized in step 2.a.;
   f. transferring said match table to the step of creating a patch file;
   g. processing said OLD string tables with a window advancement subroutine thereby possibly selecting a plurality of blocks from said OLD file and processing each selected block of the plurality of blocks with said string table preparation subroutine;
   h. processing said OLD string tables with a window trimming subroutine thereby possibly deleting a plurality of said OLD string tables which are no longer required and deleting memory containing portions of said NEW file which are no longer referenced by the NEW string table;
   i. selecting a next unprocessed block from said NEW file; and
   j. repeating steps through (i) until said NEW file has been entirely processed.

3. The method of claim 2 wherein said match table preparation subroutine identifies exactly matching strings and approximately matching strings.

4. The method of claim 3 wherein said match table preparation subroutine defines two strings as approximately matching when the ratio of mismatches to total characters is less than a selected proportion and each block of adjacent characters contains fewer mismatches than a fixed value.

5. The method of claim 3 wherein said match table preparation subroutine optimizes the lengths of the approximate or exact matches prior to patch file building, said optimization based on estimates of the relative coding efficiency of matches and mismatches.

6. The method of claim 1 wherein said patch file creation method uses variable-length codes selected separately for each block of said NEW file from step 1.a.i.(a).

7. The method of claim 6 wherein said patch file creation method encodes each block from step 1.a.i.(a) using either approximate matches or exact matches, with the decision based on which method produces a smaller coded block.

8. The method of claim 3 wherein said match table preparation subroutine proceeds by locating a fixed-length exact match using said NEW string table and said OLD string tables, then extending said exact match to a longer approximate match in the forward and reverse directions.

9. The method of claim 2 wherein said string table preparation subroutine records and indexes fixed-length substrings whose positions within said selected block are a multiple of a fixed granularity, which is selected from a plurality of integer values.

10. The method of claim 2 wherein said match table preparation subroutine, after examining a string in said NEW file, will then advance by an amount which is calculated from the length of the longest exactly matching string and the length of the longest approximately matching string.

11. The method of claim 2 wherein said match table preparation subroutine, after examining a string in said NEW file, will advance by an amount which is at least a certain fixed minimum advancement increment, which is selected from a plurality of integer values.

12. The method of claim 2 wherein said match table preparation subroutine limits the number of identical fixed-length substrings which will be examined in any one of the OLD or NEW string tables to a certain fixed maximum chain length amount, which is selected from a plurality of integer values.

13. The method of claim 2 wherein said match table preparation subroutine has special provisions to efficiently process strings in said OLD file or in said NEW file consisting of repeated patterns of at least one of a plurality of lengths of characters, said special provisions to avoid repeatedly comparing substrings comprising said repeated patterns.

14. The method of claim 6 wherein said patch file creation method uses separate variable-length code tables for characters, displacements and lengths, said character code table to be used for encoding characters which are not a part of any match, as well as for encoding special codes indicating matches, which are followed by lengths and optional displacements or differences, coded using the length and displacement code tables, respectively.

15. The method of claim 14 wherein said special code for matches is selected from the group consisting of:
   a. a match in a prior portion of said NEW file, with length and displacement;
   b. a match in a prior portion of said OLD file, with length and displacement;

c. a match in a prior portion of said OLD file in which the displacement exceeds the displacement of the previous prior OLD file match, with length and difference;

c. a match in a prior portion of said OLD file in which the displacement is less than the displacement of the previous prior OLD file match, with length and difference;

c. a match in a prior portion of said OLD file in which the displacement is equal to the displacement of the previous prior OLD file match, with length only;

d. a match in a later portion of said OLD file, with length and displacement;

e. a match in a later portion of said OLD file in which the displacement exceeds the displacement of the previous later OLD file match, with length and difference;

f. a match in a later portion of said OLD file in which the displacement is less than the displacement of the previous later OLD file match, with length and difference;

g. a match in a later portion of said OLD file in which the displacement is equal to the displacement of the previous later OLD file match, with length only; and h. a match at the same position of said OLD file, with length only.

16. The method of claim 14 wherein said patch file creation method uses special character table encodings for mismatches of at least one of a plurality of lengths of characters surrounded by an otherwise matching string, said character table encoding followed by the appropriate number of characters to indicate mismatch contents, followed by a displacement table encoding of the distance between the beginning of said mismatch and the end of the previous mismatch in said surrounding string, or beginning of said surrounding string if this is the first mismatch in surrounding string.

17. The method of claim 16 wherein said patch file creation method, in producing said mismatch encodings, encodes the difference between the actual character in said NEW file and the expected character in said surrounding matching string.

18. The method of claim 16 wherein said patch file creation method maintains a list of recently used mismatch differences for each mismatch size and uses special character table encodings to represent mismatches for which the mismatch difference is identical to one of the recently-used mismatches, said encodings to be followed by an index into said list and a displacement table encoding representing the position of said mismatch as described in claim 15.

19. The method of claim 14 wherein said patch file creation method encodes each fixed size block of the NEW file from step 1.a.i.(a). using one of the following encoding methods, with the decision based on which method produces the smallest encoded block:
   a. code tables having variable length codes for characters, displacements and lengths, the code tables to be computed optimally for a selected block and with the code tables included in the patch file block encoding;
   b. fixed variable-length codes for characters, displacements and lengths, the fixed length codes designed to be optimal for equally-likely codewords;
   c. the variable length codes for characters, displacements and lengths which were used for encoding the immediately preceding fixed size block of the NEW file; or
   d. bypass encoding, in which the block in the new file is transmitted in its entirety.

20. The method of claim 1 wherein said patch apply program comprises the steps of:
   a. reconstructing any necessary variable-length code tables from information in the patch file;
   b. interpreting coded data in patch file to recover character, match and mismatch information; and
   c. building said NEW file from said OLD file and said character, match and mismatch information.

21. An apparatus for controlling a general purpose computer so as to compare an OLD file and a NEW file, to construct a patch file containing the differences between said files, and subsequently enabling a general purpose computer provided with said patch file to construct said NEW file from said OLD file and said patch file, comprising:
   a. file input storage means for storing two currently selected blocks of said NEW file and a plurality of currently selected blocks of said OLD file;
   b. string table storage means for storing a plurality of OLD string tables and a NEW string table, each comprising a plurality of fixed-length substrings and associated indices within a currently selected block of the OLD or the NEW file selected from the file input storage means;
   c. a string table preparation circuit for selecting and indexing successive portions of each of the plurality of currently selected blocks of the OLD file so that contents of said string table storage means are constructed based on said selected block;
   d. match table storage means for storing data structures describing exact matches and approximate matches between regions of the currently selected block of the NEW file and:
      i. earlier regions of said currently selected block of the NEW file or
      ii. regions of the previously selected block of the NEW file or
      iii. regions of one of a plurality of currently selected blocks of the OLD file;
   e. a match table preparation circuit forming contents of said match table storage means by:
      i. using contents of the string table storage means to locate copies of fixed-length substrings of said selected block of the NEW file in:
         (a) earlier portions of said currently selected block of the NEW file or
         (b) previously selected block of the NEW file or
         (c) one of said currently selected blocks of the OLD file,
      ii. extending said matches to longer approximate matches in the forward and reverse directions,
      iii. recording said matches, said approximate matches and mismatch information, and
      iv. updating said NEW string table as portions of said NEW file are processed;
   f. a match table optimization circuit controlling the lengths of the approximate matches in the data structures in the match table storage means to produce a minimized patch file, said optimization based on estimates of relative coding efficiency of matches and mismatches;
   g. a patch file encoding circuit producing successive blocks of said patch file from optimized match table; and
   h. a patch file apply circuit combining said patch file and said OLD file, producing said NEW file.

22. The apparatus of claim 21 wherein said match table preparation circuit defines two strings as approximately matching when the ratio of mismatches to total characters is less than a selected proportion and each block of adjacent characters contains fewer mismatches than a fixed value.

23. The apparatus of claim 21 wherein said patch file encoding circuit uses variable-length codes selected separately for each block of said NEW file.

24. The apparatus of claim 21 wherein said patch file encoding circuit encodes each block using either the approximate matches or the exact matches, with the decision based on which method produces a smaller coded block.

25. The apparatus of claim 21 wherein said string table preparation circuit records and indexes only those fixed-length substrings of the OLD file whose positions within said selected block are a multiple of a fixed granularity, which is selected from a plurality of integer values.

26. The apparatus of claim 21 wherein said match table preparation circuit, after examining a string in said NEW file, will then advance by an amount which is calculated from the length of the longest exactly matching string and the length of the longest approximately matching string.

27. The apparatus of claim 21 wherein said match table preparation circuit, after examining a string in said NEW file, will advance by an amount which is at least a certain fixed minimum advancement increment, which is selected from a plurality of integer values.

28. The apparatus of claim 21 wherein said match table preparation circuit limits the number of identical fixed-length substrings which will be examined in any one OLD or NEW string table to a certain fixed maximum chain length amount, which is selected from a plurality of integer values.

29. The apparatus of claim 21 wherein said match table preparation circuit has special provisions to efficiently process strings in said OLD file or in said NEW file consisting of repeated patterns of at least one of a plurality of lengths of characters, said special provisions to avoid repeatedly comparing substrings comprising said repeated patterns.

30. The apparatus of claim 23 wherein said patch file encoding circuit uses separate variable-length code tables for characters, displacements and lengths, said character code table to be used for encoding characters which are not a part of any match, as well as for encoding special codes indicating matches, which are followed by lengths and optional displacements or differences, coded using the length and displacement code tables, respectively.

31. The apparatus of claim 30 wherein said special codes for matches comprise the following:
 a. a match in a prior portion of said NEW file, with length and displacement;
 b. a match in a prior portion of said OLD file, with length and displacement;
 c. a match in a prior portion of said OLD file in which the displacement exceeds the displacement of the previous prior OLD file match, with length and difference;
 d. a match in a prior portion of said OLD file in which the displacement is less than the displacement of the previous prior OLD file match, with length and difference;
 e. a match in a prior portion of said OLD file in which the displacement is equal to the displacement of the previous prior OLD file match, with length only;
 f. a match in a later portion of said OLD file, with length and displacement;
 g. a match in a later portion of said OLD file in which the displacement exceeds the displacement of the previous later OLD file match, with length and difference;
 h. a match in a later portion of said OLD file in which the displacement is less than the displacement of the previous later OLD file match, with length and difference;
 i. a match in a later portion of said OLD file in which the displacement is equal to the displacement of the previous later OLD file match, with length only; and
 j. a match at the same position of said OLD file, with length only.

32. The apparatus of claim 30 wherein said patch file encoding circuit uses special character table encodings for mismatches of at least one of a plurality of lengths of characters surrounded by an otherwise matching string, said character table encoding followed by the appropriate number of characters to indicate mismatch contents, followed by a displacement table encoding of the distance between the beginning of said mismatch and the end of the previous mismatch in said surrounding string, or beginning of said surrounding string if this is the first mismatch in surrounding string.

33. The apparatus of claim 32 wherein said patch file encoding circuit, in producing said mismatch encodings, encodes the difference between the actual character in said NEW file and the expected character in said surrounding matching string.

34. The apparatus of claim 33 wherein said patch file encoding circuit maintains a list of recently used mismatch differences for each mismatch size and uses special character table encodings to represent mismatches for which the mismatch difference is identical to one of the recently-used mismatches, said encodings to be followed by an index into said list and a displacement table encoding representing the position of said mismatch of claim 32.

35. The apparatus of claim 30 wherein said patch file encoding circuit encodes each fixed size block of the NEW file using one of the following encoding methods, with the decision based on which method produces the smallest encoded patch file block:
 a. variable-length codes for characters, displacements and lengths, the codes to be computed optimally for this block and tables for the codes included in the patch file block encoding;
 b. fixed variable-length codes for characters, displacements and lengths, the codes designed to be optimal for equally-likely codewords;
 c. the variable-length codes for characters, displacements and lengths, which were used for encoding the immediately preceding fixed size block of the NEW file; or
 d. bypass encoding, in which the fixed size block in the NEW file is transmitted in its entirety.

36. The apparatus of claim 21 wherein said patch apply circuit performs the functions of:
 a. reconstructing any necessary variable-length code tables from information in the patch file;
 b. interpreting coded data in patch file to recover character, match and mismatch information; and
 c. building said NEW file from said OLD file and said character, match and mismatch information.

37. A system for converting an OLD computer file into an updated NEW computer file, the system comprising:
 a. means for identifying differences between said OLD file and a NEW computer file by passing both files through a patch build program, wherein said patch build program comprises;
  i. means for identifying matches in which the NEW file is divided into blocks of fixed size and
   (a.) each block is successively compared to a contiguous group of blocks of fixed size in the OLD file; and
   (b.) each pair of adjacent blocks of the NEW file is scanned for matched strings whose starting positions in the NEW file differ by less than a fixed window size;

ii. means for creating a patch file based on matches identified by the match identification means, wherein said patch file comprises a plurality of blocks corresponding to the fixed size blocks of the NEW file and incorporates matched string in the OLD file and the matched strings in said NEW file; and b. means for combining said OLD file and said patch file by passing both files through a patch apply program to obtain said NEW file.

* * * * *